United States Patent
Tzannes et al.

(10) Patent No.: US 9,258,411 B2
(45) Date of Patent: Feb. 9, 2016

(54) FORENSIC DIAGNOSTIC CAPABILITY INCLUDING G.INP

(75) Inventors: Marcos C. Tzannes, Orinda, CA (US); David Krinsky, Acton, MA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 13/505,816

(22) PCT Filed: Nov. 4, 2010

(86) PCT No.: PCT/US2010/055422
§ 371 (c)(1),
(2), (4) Date: Jul. 20, 2012

(87) PCT Pub. No.: WO2011/056952
PCT Pub. Date: May 12, 2011

(65) Prior Publication Data
US 2012/0275505 A1    Nov. 1, 2012

Related U.S. Application Data

(60) Provisional application No. 61/258,125, filed on Nov. 4, 2009, provisional application No. 61/259,048, filed on Nov. 6, 2009, provisional application No. 61/290,679, filed on Dec. 29, 2009.

(51) Int. Cl.
*H04K 1/10* (2006.01)
*H04M 3/08* (2006.01)
(Continued)

(52) U.S. Cl.
CPC . *H04M 3/08* (2013.01); *H04L 5/14* (2013.01); *H04L 12/403* (2013.01); *H04L 41/0631* (2013.01); *H04M 3/2209* (2013.01); *H04M 3/2227* (2013.01); *H04M 11/062* (2013.01)

(58) Field of Classification Search
CPC ......... H04B 1/00; H04B 3/32; H04M 3/2209; H04M 3/2227; H04L 1/20; H04L 5/0007; H04L 1/0045; H04L 27/2626; Y02B 60/36
USPC ................... 375/224, 260, 259, 346; 455/296
See application file for complete search history.

(56) References Cited

U.S. PATENT DOCUMENTS

2001/0040918 A1* 11/2001 Krinsky et al. ............... 375/222
2008/0253401 A1* 10/2008 Thyagarajan et al. ........ 370/485
(Continued)

OTHER PUBLICATIONS
International Telecommunication Union, Recommendation G.992.3, Series G: Transmission Systems and Media, Digital Systems and Networks, Jan. 2005, 436 pages.
(Continued)

*Primary Examiner* — Leila Malek
(74) *Attorney, Agent, or Firm* — Oblon, McClelland, Maier & Neustadt, L.L.P.

(57) ABSTRACT

There is a need for a forensic diagnostic capability to facilitate a greater understanding of why xDSL transceivers are subject to otherwise inexplicable service interruptions during Showtime (steady state data transmission mode). In certain exemplary embodiments, diagnostic data from a previous Showtime is stored and then communicated to another transceiver and/or reported (or communicated) to a management entity. The stored diagnostic data can be used to determine why the service interruption occurred. In other embodiments, one or more portions diagnostic data from a last Showtime are stored. In additional embodiments, this diagnostic data is collected immediately prior to exiting Showtime and/or retraining (the "last" data collected prior to exiting Showtime and/or retraining). Alternatively, or in addition, the diagnostic data can be collected during a current Showtime using a sliding window that covers the most recently received signals and communicated to another transceiver and/or a management entity during the current Showtime.

32 Claims, 8 Drawing Sheets

(51) Int. Cl.
*H04L 5/14* (2006.01)
*H04L 12/403* (2006.01)
*H04L 12/24* (2006.01)
*H04M 3/22* (2006.01)
*H04M 11/06* (2006.01)

(56) References Cited

U.S. PATENT DOCUMENTS

| | | | | |
|---|---|---|---|---|
| 2009/0110105 | A1* | 4/2009 | Tzannes | 375/267 |
| 2009/0219822 | A1* | 9/2009 | Variyath et al. | 370/245 |
| 2009/0254952 | A1* | 10/2009 | Sridhar et al. | 725/92 |
| 2009/0263126 | A1* | 10/2009 | Mercier et al. | 398/33 |
| 2010/0278222 | A1* | 11/2010 | De Lind Van Wijngaarden et al. | 375/220 |
| 2012/0275505 | A1* | 11/2012 | Tzannes et al. | 375/224 |

OTHER PUBLICATIONS

International Telecommunication Union, Recommendation G.992.5, Series G: Transmission Systems and Media, Digital Systems and Networks, May 2003, 92 pages.

International Telecommunication Union, Recommendation G.993.2, Series G: Transmission Systems and Media, Digital Systems and Networks, Feb. 2006, 252 pages.

International Telecommunication Union, Recommendation G.997.1, Series G: Transmission Systems and Media, Digital Systems and Networks, Apr. 2009, 128 pages.

International Telecommunication Union, Recommendation G.998.4, Series G: Transmission Systems and Media, Digital Systems and Networks, Jun. 2010, 78 pages.

International Telecommunication Union—Study Period 2009-2012 "G.INP: Working Text for PMS-TC ARQ for ADSL2" COM 15-C 108-E; XP017446807; Nov. 20, 2008, pp. 1-56.

"IEEE Standard 802.11: Part 11: Wireless LAN Medium Access Control (MAC) and Physical Layer (PHY) Specifications," IEEE Standard 802.11-2007, Nov. 30, 2007, pp. 1-1233.

"IEEE Standard 802.3: Part 3: Carrier Sense Multiple Access with Collision Detection (CSMA/CD) Access Method and Physical Layer Specifications" IEEE Standard 802.3-2008, Dec. 26, 2008, pp. 1-2977.

International Search Report for International Application No. PCT/US2010/055422, mailed Jan. 5, 2012.

Written Opinion for International Application No. PCT/US2010/055422, mailed Jan. 5, 2012.

* cited by examiner

FORENSIC DIAGNOSTIC CAPABILITY INCLUDING G.INP

RELATED APPLICATION DATA

This application is a national stage application under 35 U.S.C. 371 of PCT Application No. PCT/US2010/055422 having an international filing date of Nov. 4, 2010, which designated the United States, which PCT application claimed the benefit of and priority under 35 U.S.C. §119(e) to U.S. Patent Application Nos. 61/258,125, filed Nov. 4, 2009, entitled "Forensic Diagnostic Capability," 61/259,048, filed Nov. 6, 2009, entitled "Forensic Diagnostic Capability including G.inp," and 61/290,679, filed Dec. 29, 2009, entitled "Forensic Diagnostic Capability including G.inp Revision 2," all of which are incorporated herein by reference in their entirety.

FIELD OF THE INVENTION

An exemplary aspect of this invention relates to communications systems. More specifically, exemplary methods, systems, means, protocols and computer-readable storage media, are directed toward communications system diagnostics and analysis.

SUMMARY

There is a need for a forensic diagnostic capability to facilitate a greater understanding of why DSL (e.g., ADSL, ADSL2/2+, VDSL, VDSL2, etc. (generically "xDSL")) transceivers are subject to otherwise inexplicable service interruptions during Showtime (steady state data transmission mode). The issue of service interruption has become a significant problem for service providers as they provide, for example, video services over DSL. One exemplary aspect is therefore directed toward addressing the need to provide one or more diagnostic tools to assist with fixing the issue of service interruptions in xDSL systems.

In certain exemplary embodiments, diagnostic data from a previous Showtime is stored and then communicated to another transceiver and/or reported (or communicated) to a management entity (e.g., a MIB or domain management device). The stored diagnostic data can be used to determine why the service interruption occurred.

In certain embodiments, one or more portions of the following exemplary diagnostic data from a last Showtime are stored. In certain embodiments, this diagnostic data is collected immediately prior to exiting Showtime and/or retraining (the "last" data collected prior to exiting Showtime and/or retraining).

Alternatively, or in addition, the diagnostic data can be one or more of collected, logged, stored and reported during a current Showtime using a sliding window (or "trail") that covers the most recently received signals and communicated to another transceiver and/or a management entity during the current Showtime.

Aspects of the parameters described below are specified in ITU Recommendations G.992.3, G.992.5, G.993.2, G.998.4 (G.inp) (which can be found at http://www.itu.int/rec/T-RLC-g), which are incorporated herein by reference in their entirety.

There are several new diagnostic parameters described herein which have not been specified in current DSL standards. These new diagnostic parameters include the following:

Uncorrected DTU Second: a second containing at least one uncorrected DTU (data transmission unit)

Retransmitted DTU Second: a second containing at least one retransmitted DTU.

Corrected DTU Second: a second containing at least one Corrected DTU.

Severely Uncorrected DTU Second: a second containing at least U1 Uncorrected DTU, where U1 is an integer value. U1 may be specified or selected based on a certain desired percentage of uncorrected DTUs in a second. For example, if there are X=10% or more uncorrected DTUs in a second, then the second may be declared as a Severely Uncorrected DTU Second, where X is a percentage. The value of X and/or U1 may be configured via a management entity (e.g., a MIB) and/or may be transmitted to and/or received from a second transceiver. For example, a service provider may configure via, for example, a MIB management interface a value for U1 (the number of uncorrected DTUs in a second for which a second will be declared as an Severely Uncorrected second) and/or X (the minimum percentage uncorrected DTUs in a second for which a second will be declared as an Severely Uncorrected second). These values of U1 and/or X may be used by an xTU-C (xDSL Transmission Unit-Central Office (e.g., ATU-C for an ADSL Transmission Unit-Central Office)) transceiver to declare a Severely Uncorrected DTU Second based on local and far-end DTU counters. Additionally, the values of U1 and/or X may be sent in a message to the xTU-R transceiver and the xTU-R may use these values to declare a Severely Uncorrected DTU Second based on local and far-end DTU counters.

Severely Retransmitted DTU Second: a second containing at least U1 Retransmitted DTU, where U1 is an integer value. U1 may be specified or selected based on a certain desired percentage of Retransmitted DTUs in a second. For example, if there are X=10% or more Retransmitted DTUs in a second then the second may be declared as a Severely Retransmitted DTU Second, where X is a percentage. The value of X and/or U1 may be configured via a management entity (e.g., a MIB) and/or may be transmitted to and/or received from a second transceiver. For example, a service provider may configure via a MIB management interface a value for U1 (the number of Retransmitted DTUs in a second for which the second will be declared as a Severely Retransmitted second) and/or X (the minimum percentage Retransmitted DTUs in a second for which the second will be declared as a Severely Retransmitted second). These values of U1 and/or X may be used by an xTU-C transceiver to declare a Severely Retransmitted DTU Second based on local and far-end DTU counters. Additionally, the values of U1 and/or X may be sent in a message to the xTU-R transceiver and the xTU-R may use these values to declare a Severely Retransmitted DTU Second based on local and far-end DTU counters.

Severely Corrected DTU Second: a second containing at least U1 Corrected DTU, where U1 is an integer value. U1 may be specified or selected based on a certain desired percentage of Corrected DTUs in a second. For example, if there are X=10% or more Corrected DTUs in a second then the second may be declared as a Severely Corrected DTU Second, where X is a percentage. The value of X and/or U1 may be configured via a management entity (e.g., a MIB) and/or may be transmitted to and/or received from a second transceiver. For example, a service provider may configure via a MIB management interface a value for U1 (the number of Corrected DTUs in a second for which the second will be declared as a Severely Corrected second) and/or X (the minimum percentage Corrected DTUs in a second for which the second will be declared as an Severely Corrected second). These values of U1 and/or X may be used by an xTU-C transceiver to declare a Severely Corrected DTU Second based on local and far-end DTU counters. Additionally, the values of U1 and/or X may be sent in a message to the xTU-R transceiver and the xTU-R may use these values to declare a Severely Corrected DTU Second based on local and far-end DTU counters.

For the parameters described below, N1 through N48, S, D1-D3, C1-C6 are integer values.

1. The Last N1 Loss Of Signal Measurements (LOSM)—LOS is typically measured 10 times per second (a 0.1 sec measurement period) by comparing a received power level with a reference power level. A LOS defect occurs if the received power level is, for example, at least 6 dB lower than the reference power level. N1 LOSM are stored with each measurement indicating whether an LOS defect has occurred or not.

LOSM=1 indicates no LOS defect is being measured
LOSM=0 indicates an LOS defect is being measured 2. The Last N2 Severely Errored Frame Measurements (SEFM)—SEF is measured by comparing two consecutive sync symbols. A SEF defect occurs when the content of two consecutively received sync symbols does not correlate with the expected content over a plurality of subcarriers. N2 SEFM are stored with each measurement indicating whether an SEF defect has occurred or not.

SEFM=1 indicates no SEF defect is being measured
SEFM=0 indicates an SEF defect is being measured 3. The Last N3 SNR Margin Measurements (SNRMM)—SNRM is updated during Showtime autonomously or on request. N3 SNRM measurements are stored with each measurement indicating the SNR Margin in dB as specified in G.992.3/5 and G.993.2.

4. Last N4 CRC Detections (CRCD)—CRC detection is accomplished by comparing the received CRC with the calculated CRC. N4 CRCD are stored with each detection indicating whether a CRC anomaly has occurred or not.

CRCM=1 indicates no CRC anomaly is being detection
CRCM=0 indicates an CRC anomaly is being detection 5. Last N5 FEC Detections (FECD)—FEC detection is done by decoding the codeword to determine if errors are being corrected. N5 FECD are stored with each detection indicating whether a FEC anomaly has occurred or not.

FECD=1 indicates no FEC anomaly is being detection
FECD=0 indicates an FEC anomaly is being detection 6. Last N6 Impulse Noise Sensor Measurements (INSM)—N6 INSM are stored with each measurement indicating whether a data symbol is severely degraded or not.

INSM=1 indicates the data symbol is not severely degraded
INSM=0 indicates the data symbol is severely degraded 7. The Last N7 Errored Second Calculations (ESC)—indicates whether any of last the N7 seconds was an errored second:

ESC=1 indicates that the second was not a errored second
ESC=0 indicates that the second was a errored second 8. The Last N8 Severely Errored Second Calculations (SESC)—indicates whether any of last N9 seconds was an severely errored second:

SESC=1 indicates that the second was not a severely errored second
SESC=0 indicates that the second was a severely errored second 9. Last Measured SNR-ps- the last SNR per subcarrier measured prior to retraining. Alternatively, or in addition, a plurality of SNR per subcarrier measurements can be one or more of logged, stored and reported. For example, the last x SNR measurements prior to retraining could be one or more of logged, stored and reported. Additionally, the Symbol-Count associated with an SNR measurement could be one or more of logged, stored and reported. For example, the SymbolCount for the measured SNR per subcarrier could correspond to count of the last or first DMT symbol used for measuring the SNR. Additionally, an SNR measurement could be one or more of logged, stored and reported for any one or more of the parameters described below and above. For example, an SNR measurement could be one or more of logged, stored and reported when a change in the LOS defect state occurs (e.g., as described in #21 below). In this example, the SNR per subcarrier would be measured at approximately same time (or as close as possible) to the SymbolCount on which the change LOS defect state occurred so that the change in the LOS defect state could be associated and/or correlated with a measured SNR per subchannel. Alternatively, or additionally, the measured SNR per subcarrier could be represented as a difference in SNR with respect to a previously measured SNR per subcarrier. One exemplary benefit of this approach includes the fact that less bits are required to represent the SNR per subcarrier thereby reducing storage requirements. For example, if a first measured SNR for a subcarrier was 30 dB and a second measured SNR for the subcarrier was 27 dB, the second SNR could be one or more of logged, stored and reported as the difference in SNR (between the first and second measurement). In this case, the logged and/or stored and/or reported SNR for the subcarrier would be −3 dB and could be represented with only 3 bits, whereas the actual SNR for the subcarrier is 27 dB and would require 5 bits for representation. For example, if the previous SNR measurement was 32 dB and the new SNR measurement was 24 dB, the reported SNR per subcarrier could be 32−24=8 dB. The SNR per subcarrier could be represented as a 3 bit unsigned integer. The format of the SNR parameter could be defined to support a granularity of 3 dB and a dynamic range of 21 dB (from −21 to 0 dB). Alternatively, or additionally, the SNR may be one or more of logged, stored and reported for a subset of subcarriers. For example, the SNR subcarrier may be stored for only one of a group of v subcarriers, where v is an integer. For example, if v=8, a stored SNR per subcarrier would represent a group of 8 SNR per subcarrier measurements, where the stored SNR per subcarrier value could be equal to the minimum SNR of the 8 subcarriers, the average SNR of the subcarriers, the maximum SNR of the 8 subcarriers, etc.

10. Last Status of the Loss of Power (LPR) Primitive
11. Last Status of Loss of Margin (LOM) Primitive
12. Last Status of Loss of Signal (LOS) Failure
13. Last Status of Loss of Frame (LOF) Failure
14. Last Status of Persistent LOS Failure
15. Last Status of Persistent LOF Failure
16. Last Status of Persistent high_BER-Hs
17. Last Status of Persistent high_BER-si
18. Reason for re-initialization or retraining (indicates one or more of the following):
Persistent LOS
Persistent LOF
High_BER-hs
High_BER-si Diagnostic Data Logged during Showtime based on the SymbolCount Diagnostic data may also be logged based on a time reference (or timestamp) called the SymbolCount. The SymbolCount is a number containing (or that indicates) the count of DMT symbols (data symbols and sync symbols) received or transmitted after entering Showtime. Alternatively, the SymbolCount may not include sync symbols. The SymbolCount can be represented using any number of bits. If the SymbolCount is represented using a S=24 bit number, it will contain the count of DMT symbols received or transmitted over the communications line after entering Showtime, modulo 16777215. Therefore, a 24 bit SymbolCount results in approximately a 1 hour time window (assuming 4000 DMT symbols per second). Alternatively, for example, in order reduce the number of bits required to represent the SymbolCount, the SymbolCount may be incremented by one for every $s^{th}$ DMT symbol transmitted or received, where s in a integer. For example, if s=256, then the symbol count will be equal to 0 for the first 256 DMT symbols (e.g., DMT symbols with count values of 1-256 or 0-255) in Showtime and then the symbol count will be equal 1 for the second 255 symbols in Showtime (e.g., DMT symbols with count values of 257-512 or 256-511), and so on. In this case, a 16 bit SymbolCount results in approximately a 1 hour time window (assuming 4000 DMT symbols per second), thereby reducing the required bits for storing the SymbolCount from 24 bits to 16 bits.

The following diagnostic data may be one or more of logged, stored and reported during Showtime. The number of octets described below is for an exemplary SymbolCount that is represented using S=24 bits (or 3 octets). Other values of S are also possible.

19. Last SymbolCount Prior to Exiting Showtime (LastSym)—indicates the SymbolCount of the last DMT symbol received or transmitted prior to exiting Showtime (S=3 octet).

20. Reason for Exiting Showtime (ExitReason)—indicates the reason exiting Showtime as one or more of the following:
 Persistent LOS
 Persistent LOF
 High_BER-hs 21. Change in LOS Defect State (CLOSD)—contains the SymbolCount of the last N21 changes of the LOS defect state. A change of the LOS defect state occurs when an LOS defect detection changes from false to true or vice-versa. For example, if a LOS defect was detected (true) on SymbolCount=950 and then the LOS defect was terminated (false) on SymbolCount=1800 then the CLOSD parameter would contain the values 950 and 1800.

22. Change in SEF Defect State (CSEFD)—contains the SymbolCount of the last N22 changes of the SEF defect state. A change of the SEF defect state occurs when an SEF defect detection changes from false to true or vice-versa. For example, if an SEF defect was detected (true) on SymbolCount=1000, and then the SEF defect was terminated (false) on SymbolCount=1500, then the CSEFD parameter would contain the values 1000 and 1500.

23. Change in LOM Defect State (CLOMD)—contains the SymbolCount of the last N23 changes of the LOM defect state. A change of the LOM defect state occurs when a LOM defect detection changes from false to true or vice-versa. For example, if an LOM defect was detected (true) on SymbolCount=1000, and then the LOM defect was terminated (false) on SymbolCount=1500, then the CLOMD parameter would contain the values 1000 and 1500.

24. Far-End Change in LOS Defect State (CLOSD-FE)—contains the SymbolCount of the last N24 changes of the far-end LOS defect state (5×3=15 octets). A change of the far-end LOS defect state occurs when a far-end LOS defect detection changes from false to true or vice-versa. For example, if a far-end LOS defect was detected (true) on SymbolCount=950, and then the far-end LOS defect was terminated (false) on SymbolCount=1800, then the CLOSD-FE parameter would contain the values 950 and 1800.

25. Change in RDI Defect State (CRDID)—contains the SymbolCount of the last N25 changes of the RDI defect state. A change of the RDI defect state occurs when an RDI defect detection changes from false to true or vice-versa. For example, if an RDI defect was detected (true) on SymbolCount=1000, and then the RDI defect was terminated (false) on SymbolCount=1500, then the CRDID parameter would contain the values 1000 and 1500.

26. Far-End Change in LOM Defect State (CLOMD-FE)—contains the SymbolCount of the last N26 changes of the far-end LOM defect state. A change of the far-end LOM defect state occurs when a far-end LOM defect detection changes from false to true or vice-versa. For example, if a far-end LOM defect was detected (true) on SymbolCount=1000, and then the far-end LOM defect was terminated (false) on SymbolCount=1500, then the CLOMD-FE parameter would contain the values 1000 and 1500.

27. Change in LOS Failure State (CLOSF)—contains the SymbolCount of the last N27 changes of the LOS failure state. A change of the LOS defect state occurs when an LOS failure detection changes from false to true or vice-versa. For example, if a LOS failure was detected (true) on SymbolCount=1000, and then the LOS failure was terminated (false) on SymbolCount=41000, then the CLOSF parameter would contain the values 1000 and 41000.

28. Change in LOF Failure State (CLOFF)—contains the SymbolCount of the last N28 changes of the LOF Failure state. A change of the LOF Failure state occurs when an LOF Failure detection changes from false to true or vice-versa. For example, if an LOF Failure was detected (true) on SymbolCount=1000, and then the LOF Failure was terminated (false) on SymbolCount=1500, then the CLOFF parameter would contain the values 1000 and 1500.

29. Change in Errored Seconds State (CESD)—contains the SymbolCount of the last N29 changes of the Errored Second state. A change of the Errored Seconds state occurs when an Errored Second detection changes from false to true or vice-versa. For example, if a Errored Second was detected (true) on SymbolCount=950, and then the Errored Second was terminated (false) on SymbolCount=1800, then the CESD parameter would contain the values 950 and 1800.

30. Successful Receiver Bitswaps (SRBS)—contains the SymbolCount of the last N30 successful bitswaps and/or the number of subcarriers (C1) changed by the bit swap. Successful Receiver Bitswap apply to bitswaps initiated by the receiver. The SymbolCount value corresponds to the DMT symbol on which the SyncFlag symbol was received. For example, if a Bit swap request message was sent requesting to change the bi (bit allocation) value on C1=10 subcarriers, and the SyncFlag was received on SymboCount=501, then the SRBS parameter would contain the values 501 and/or 10.

31. Successful Transmitter Bitswaps (STBS)—contains the SymbolCount of the last N31 successful bitswaps and/or the number of subcarriers (C2) changed by the bit swap. Successful Transmitter Bitswap apply to bitswaps performed by the transmitter based on a request by the other transceiver. The SymbolCount value corresponds to the DMT symbol on which the SyncFlag symbol was transmitted. For example, if a Bit swap request message was sent requesting to change the bi value on C2=10 subcarriers, and the SyncFlag was transmitted on SymboCount=501, then the STBS parameter would contain the values 501 and/or 10.

32. Failed Bitswap Request (FBSR)—contains the SymbolCount of the last N32 failed bitswaps and/or the number of subcarriers (C3) requested to be changed by the failed bit swap. Failed Bitswap requests apply to bitswaps initiated by the receiver. A failed bit swap request occurs when a SyncFlag is not received after a Bit swap request message is sent. The SymbolCount value corresponds to the DMT symbol on which the BitSwap timeout expired. For example, if a Bit swap request message was sent was sent requesting to change the bi value on C3=10 subcarriers, and the BitSwap timed out on SymboCount=500, then the FBSR parameter would contain the value 500 and/or 10.

33. Successful Receiver SRA (SRS)—contains the SymbolCount of the last N33 successful SRA and/or the number of subcarriers (C4) changed by the SRA and/or the data rate change (D1). Successful Receiver SRA applies to SRAs initiated by the receiver. The SymbolCount value corresponds to the DMT symbol on which the SyncFlag symbol was received. For example, if a SRA request message was sent requesting to change the bi value on C4=10 subcarriers with data rate change of D1=−700 kbps, and the SyncFlag was received on SymboCount=501, then the SRS parameter would contain the values 501 and/or 10 and/or −700 kbps.

34. Successful Transmitter SRA (STS)—contains the SymbolCount of the last N34 successful SRAs and/or the number of subcarriers (C5) changed by the SRA and/or the data rate change (D2). Successful Transmitter SRA applies to SRAs performed by the transmitter based on a request by the other transceiver. The SymbolCount value corresponds to the DMT symbol on which the SyncFlag symbol was transmitted. For example, if a SRA request message was sent requesting to change the bi value on C5=10 subcarriers with data rate change of D2=300 kbps, and the SyncFlag was transmitted on SymboCount=501, then the STS parameter would contain the values 501 and/or 10 and/or 300 kbps.

35. Failed SRA Request (FSR)—contains the SymbolCount of the last N35 failed SRAs and/or the number of subcarriers (C6) requested to be changed by the failed SRA and/or the data rate change (D3) requested by the failed SRA. Failed SRA requests apply to SRAs initiated by the receiver. A failed SRA request occurs when a SyncFlag is not received after a SRA request message is sent. The SymbolCount value corresponds to the DMT symbol on which the SRA timeout expired. For example, if a Bit swap request message was sent was sent requesting to change the bi value on C6=10 subcarriers with data rate change of D3=−500 kbps, and the SRA timed out on SymboCount=500, then the FSR parameter would contain the value 500 and/or 10 and/or −500 kbps.

36. Change in leftr Defect State (CleftrD)—contains the SymbolCount of the last N36 changes of the low error-free throughput rate (leftr) defect state. A change of the leftr defect state occurs when a leftr defect detection changes from false to true or vice-versa. For example, if a leftr defect was detected (true) on SymbolCount=950, and then the leftr defect was terminated (false) on SymbolCount=1800, then the CleftrD parameter would contain the values 950 and 1800.

37. Change in "leftr Defect Second" State (CISD)—contains the SymbolCount of the last N37 changes of the "leftr defect second" state. A change of the "leftr defect second" state occurs when a "leftr defect second" detection changes from false to true, or vice-versa. For example, if a "leftr defect second" was detected (true) on SymbolCount=950, and then the "leftr defect second" was terminated (false) on SymbolCount=1800, then the CISD parameter would contain the values 950 and 1800.

38. CRC Anomaly (CRCA)—contains the SymbolCount of the last N38 CRC anomaly (i.e., CRC error).

39. Uncorrected DTUs (UDTU)—contains the SymbolCount of the last N39 Uncorrected DTUs (Data Transmission Unit) as determined by the transmitter or the receiver. DTUs are used for retransmission in G.inp.

40. Corrected DTUs (CDTU)—contains the SymbolCount of the last N40 Corrected DTUs as determined by the transmitter or the receiver 41. Retransmitted DTUs (RDTU)—contains the SymbolCount of the last N41 Retransmitted DTUs as determined by the transmitter or the receiver.

42. Change in Uncorrected DTU Second State (CUDS)—contains the SymbolCount of the last N42 changes of the Uncorrected DTU Second state. A change of the Uncorrected DTU Second state occurs when an Uncorrected DTU Second detection changes from false to true, or vice-versa.

43. Change in Retransmitted DTU Second State (CRDS)—contains the SymbolCount of the last N42 changes of the Retransmitted DTU Second state. A change of the Retransmitted DTU Second state occurs when a Retransmitted DTU Second detection changes from false to true, or vice-versa.

44. Change in Corrected DTU Second State (CCDS)—contains the SymbolCount of the last N42 changes of the Corrected DTU Second state. A change of the Corrected DTU Second state occurs when a Corrected DTU Second detection changes from false to true, or vice-versa.

45. Retransmission Request Message (RRM)—contains the SymbolCount of the last N45 retransmission requests messages sent by the receiver or received by the transmitter. For example, if a retransmission requests message was sent (or received) on SymboCount=500, then the RRM parameter would contain the value 500.

46. Change in Severely Uncorrected DTU Second State (CUDS)—contains the SymbolCount of the last N46 changes of the Severely Uncorrected DTU. A change of the Uncorrected DTU Second state occurs when an Uncorrected DTU Second detection changes from false to true, or vice-versa.

47. Change in Severely Retransmitted DTU Second State (CUDS)—contains the SymbolCount of the last N47 changes of the Retransmitted DTU Second state. A change of the Retransmitted DTU Second state occurs when a Retransmitted DTU Second detection changes from false to true, or vice-versa.

48. Change in Severely Corrected DTU Second State (CUDS)—contains the SymbolCount of the last N48 changes of the Corrected DTU Second state. A change of the Corrected DTU Second state occurs when a Corrected DTU Second detection changes from false to true, or vice-versa.

Aspects of the invention thus relate to a communications system, transceiver or management interface capable of, one or more means for, computer instructions and/or a method for receiving or transmitting a plurality of multicarrier symbols in a first data transmission state (or Showtime state or steady state transmission);

determining and/or storing and/or measuring and/or detecting, prior to exiting the first data transmission state, one or more of the following diagnostic data:
   a. A plurality of LOS measurements
   b. A plurality of SEF measurements
   c. A plurality of SNRM measurements
   d. A plurality of Impulse Noise Sensor measurements
   e. A plurality of CRC detections f. A plurality of FEC detections g. A reason for retraining h. A plurality of Errored Second calculations i. A plurality of severely Errored Second calculations j. A plurality of consecutive Errored Second calculations k. A plurality of consecutive severely Errored Second calculations l. A plurality of consecutive LOS measurements m. A plurality of consecutive SEF measurements n. A plurality of consecutive SNRM measurements o. A plurality of consecutive Impulse Noise Sensor measurements p. A plurality of consecutive CRC detections q. A plurality of consecutive FEC detections;

exiting the first data transmission state and entering an initialization procedure or diagnostic mode;

transmitting to (or receiving from) second transceiver a message during the initialization procedure or diagnostic mode, wherein the message contains information (e.g. a bit field) indicating at least one of the diagnostic data from step 2 above; and optionally providing or reporting to a Management Entity information (e.g. a bit field) indicating at least one of the diagnostic data from steps 2 above.

Aspects of the invention also relate to a communications system, transceiver or management interface capable of, one or more means for, computer instructions and/or a method for receiving or transmitting a plurality of multicarrier symbols (or DMT) in a first data transmission state (or Showtime state or steady state transmission);

determining a SymbolCount, wherein the SymbolCount is a number that indicates the count of multicarrier symbols received or transmitted over the line after entering Showtime;

determining and/or storing and/or measuring and/or detecting, prior to exiting the first data transmission state, one or more of the following diagnostic data:

a. the SymbolCount of the last DMT symbol received or transmitted prior to exiting Showtime b. the SymbolCount of at least one change of the LOS defect state c. the SymbolCount of at least one change of the SEF defect state d. the SymbolCount of at least one change of the LOM defect state e. the SymbolCount of at least one change of the far-end LOS defect state f. the SymbolCount of at least one change of the RDI defect state g. the SymbolCount of at least one change of the far-end LOM defect state h. the SymbolCount of at least one change of the LOS failure state i. the SymbolCount of at least one change of the LOF failure state j. the SymbolCount of at least one change of the Errored Second state k. the SymbolCount of at least one change of the Severely Errored Second state l. the SymbolCount and/or number of subcarriers of at least one Successful Receiver Bitswap m. the SymbolCount and/or number of subcarriers of at least one Successful Transmitter Bitswap n. the SymbolCount and/or number of subcarriers of at least one Failed Bitswap Request o. the SymbolCount and/or number of subcarriers and/or data rate change of at least one Successful Receiver SRA p. the SymbolCount and/or number of subcarriers and/or data rate change of at least one Successful Transmitter SRA q. the SymbolCount and/or number of subcarriers and/or data rate change of at least one Failed SRA r. the SymbolCount of at least one change in the leftr defect state s. the SymbolCount of at least one change of the leftr defect Second state t. the SymbolCount of at least one CRC error anomaly u. the SymbolCount of at least one Uncorrected DTU v. the SymbolCount of at least one Retransmitted DTU w. the SymbolCount of at least one Corrected DTU x. the SymbolCount of at least one changes of the Uncorrected DTU Second state y. the SymbolCount of at least one changes of the Retransmitted DTU Second state z. the SymbolCount of at least one change of the Corrected DTU Second state aa. the SymbolCount of at least one Retransmission request message.

bb. the SymbolCount of at least one change of the Severely Uncorrected DTU Second state cc. the SymbolCount of at least one change of the Severely Retransmitted DTU Second state dd. the SymbolCount of at least one change of the Severely Corrected DTU Second state;

exiting the first data transmission state and entering an initialization procedure or diagnostic mode;

transmitting to (or receiving from) second transceiver a message during the initialization procedure or diagnostic mode, wherein the message contains information (e.g., a bit field) indicating at least one of the diagnostic data from step 3 above; and optionally providing or reporting to a Management Entity information (e.g., a bit field) indicating at least one of the diagnostic data from steps 3 above.

Another exemplary aspect of the invention is directed toward a communications system, transceiver or management interface capable of, one or more means for, computer instructions and/or a method for:

receiving or transmitting a plurality of multicarrier symbols in a first data transmission state (or Showtime state or steady state transmission);

determining and/or storing and/or measuring and/or detecting, prior to exiting the first data transmission state, one or more of the following diagnostic data:

a. A plurality of LOS measurements b. A plurality of SEF measurements c. A plurality of SNRM measurements d. A plurality of Impulse Noise Sensor measurements e. A plurality of CRC detections f. A plurality of FEC detections g. A reason for retraining h. A plurality of Errored Second calculations i. A plurality of severely Errored Second calculations j. A plurality of consecutive Errored Second calculations k. A plurality of consecutive severely Errored Second calculations l. A plurality of consecutive LOS measurements m. A plurality of consecutive SEF measurements n. A plurality of consecutive SNRM measurements o. A plurality of consecutive Impulse Noise Sensor measurements p. A plurality of consecutive CRC detections q. A plurality of consecutive FEC detections exiting the first data transmission state and entering a second data transmission state;

receiving a message from a second transceiver requesting at least one of the diagnostic data from step 2 above;

transmitting to second transceiver a message during the second data transmission state, wherein the message contains information (e.g. a bit field) indicating at least one of the diagnostic data from step 2 above; and optionally providing or reporting to a Management Entity information (e.g. a bit field) indicating at least one of the diagnostic data from step 2 above.

Another exemplary aspect of the invention is directed toward a communications system, transceiver or management interface capable of, one or more means for, computer instructions and/or a method for:

receiving or transmitting a plurality of multicarrier symbols (or DMT) in a first data transmission state (or Showtime state or steady state transmission);

determining a SymbolCount, wherein the SymbolCount is a number that indicates the count of multicarrier symbols received or transmitted over the line after entering Showtime;

determining and/or storing and/or measuring and/or detecting, prior to exiting the first data transmission state, one or more of the following diagnostic data:

a. the SymbolCount of the last DMT symbol received or transmitted prior to exiting Showtime b. the SymbolCount of at least one change of the LOS defect state c. the SymbolCount of at least one change of the SEF defect state d. the SymbolCount of at least one change of the LOM defect state e. the SymbolCount of at least one change of the far-end LOS defect state f. the SymbolCount of at least one change of the RDI defect state g. the SymbolCount of at least one change of the far-end LOM defect state h. the SymbolCount of at least one change of the LOS failure state i. the SymbolCount of at least one change of the LOF failure state j. the SymbolCount of at least one change of the Errored Second state k. the SymbolCount of at least one change of the Severely Errored Second state l. the SymbolCount and/or number of subcarriers of at least one Successful Receiver Bitswap m. the SymbolCount and/or number of subcarriers of at least one Successful Transmitter Bitswap n. the SymbolCount and/or number of subcarriers of at least one Failed Bitswap Request o. the SymbolCount and/or number of subcarriers and/or data rate change of at least one Successful Receiver SRA p. the SymbolCount and/or number of subcarriers and/or data rate change of at least one Successful Transmitter SRA q. the SymbolCount and/or number of subcarriers and/or data rate change of at least one Failed SRA r. the SymbolCount of at least one change in the leftr defect state s. the SymbolCount of at least one change of the leftr defect Second state t. the SymbolCount of at least one CRC error anomaly u. the SymbolCount of at least one Uncorrected DTU v. the SymbolCount of at least one Retransmitted DTU w. the SymbolCount of at least one Corrected DTU x. the SymbolCount of at least one changes of the Uncorrected DTU Second state y. the SymbolCount of at least one change of the Retransmitted DTU Second state z. the SymbolCount of at least one change of the Corrected DTU Second state aa. the SymbolCount of at least one Retransmission request message.

bb. the SymbolCount of at least one change of the Severely Uncorrected DTU Second state cc. the SymbolCount of at least one change of the Severely Retransmitted DTU Second state dd. the SymbolCount of at least one change of the Severely Corrected DTU Second state;

exiting the first data transmission state and entering a second data transmission state;

receiving a message from a second transceiver requesting at least one of the diagnostic data from step 3 above;

transmitting to second transceiver a message during the second data transmission state, wherein the message contains information (e.g., a bit field) indicating at least one of the diagnostic data from step 3 above; and optionally providing or reporting to a Management Entity information (e.g., a bit field) indicating at least one of the diagnostic data from step 3 above.

Another exemplary aspect of the invention is directed toward a communications system, transceiver or management interface capable of, one or more means for, computer instructions and/or a method for:

receiving or transmitting a plurality of multicarrier symbols in a data transmission state (or Showtime state or steady state transmission);

determining and/or storing and/or measuring and/or detecting, prior to exiting the first data transmission state, one or more of the following diagnostic data:

a. A plurality of LOS measurements b. A plurality of SEF measurements c. A plurality of SNRM measurements d. A plurality of Impulse Noise Sensor measurements e. A plurality of CRC detections f. A plurality of FEC detections g. A reason for retraining h. A plurality of Errored Second calculations i. A plurality of severely Errored Second calculations j. A plurality of consecutive Errored Second calculations k. A plurality of consecutive severely Errored Second calculations l. A plurality of consecutive LOS measurements m. A plurality of consecutive SEF measurements n. A plurality of consecutive SNRM measurements o. A plurality of consecutive Impulse Noise Sensor measurements p. A plurality of consecutive CRC detections q. A plurality of consecutive FEC detections;

receiving a message from a second transceiver requesting at least one of the diagnostic data from step 2 above;

transmitting to second transceiver a message, wherein the message contains information (e.g., a bit field) indicating at least one of the diagnostic data from step 2 above; and optionally providing or reporting to a Management Entity information (e.g., a bit field) indicating at least one of the diagnostic data from step 2 above.

Yet another exemplary aspect of the invention is directed toward a communications system, transceiver or management interface capable of, one or more means for, computer instructions and/or a method for:

receiving or transmitting a plurality of multicarrier symbols (or DMT) in a first data transmission state (or Showtime state or steady state transmission);

determining a SymbolCount, wherein the SymbolCount is a number that indicates the count of multicarrier symbols received or transmitted over the line after entering Showtime;

determining and/or storing and/or measuring and/or detecting, prior to exiting the first data transmission state, one or more of the following diagnostic data:

a. the SymbolCount of the last DMT symbol received or transmitted prior to exiting Showtime b. the SymbolCount of at least one change of the LOS defect state c. the SymbolCount of at least one change of the SEF defect state d. the SymbolCount of at least one change of the LOM defect state e. the SymbolCount of at least one change of the far-end LOS defect state f. the SymbolCount of at least one change of the RDI defect state g. the SymbolCount of at least one change of the far-end LOM defect state h. the SymbolCount of at least one change of the LOS failure state i. the SymbolCount of at least one change of the LOF failure state j. the SymbolCount of at least one change of the Errored Second state k. the SymbolCount of at least one change of the Severely Errored Second state l. the SymbolCount and/or number of subcarriers of at least one Successful Receiver Bitswap m. the SymbolCount and/or number of subcarriers of at least one Successful Transmitter Bitswap n. the SymbolCount and/or number of subcarriers of at least one Failed Bitswap Request o. the SymbolCount and/or number of subcarriers and/or data rate change of at least one Successful Receiver SRA p. the SymbolCount and/or number of subcarriers and/or data rate change of at least one Successful Transmitter SRA q. the SymbolCount and/or number of subcarriers and/or data rate change of at least one Failed SRA r. the SymbolCount of at least one change in the leftr defect state s. the SymbolCount of at least one change of the leftr defect Second state t. the SymbolCount of at least one CRC error anomaly u. the SymbolCount of at least one Uncorrected DTU v. the SymbolCount of at least one Retransmitted DTU w. the SymbolCount of at least one Corrected DTU x. the SymbolCount of at least one change of the Uncorrected DTU Second state y. the SymbolCount of at least one change of the Retransmitted DTU Second state z. the SymbolCount of at least one change of the Corrected DTU Second state aa. the SymbolCount of at least one Retransmission request message.

bb. the SymbolCount of at least one change of the Severely Uncorrected DTU Second state cc. the SymbolCount of at least one changes of the Severely Retransmitted DTU Second state dd. the SymbolCount of at least one change of the Severely Corrected DTU Second state;

receiving a message from a second transceiver requesting at least one of the diagnostic data from step 3 above;

transmitting to second transceiver a message, wherein the message contains information (e.g. a bit field) indicating at least one of the diagnostic data from step 3 above; and optionally providing or reporting to a Management Entity information (e.g., a bit field) indicating at least one of the diagnostic data from step 3 above.

Any of the above aspects and further aspects may be located in a network management system and/or network operation device that is located inside or outside the network and/or the transceiver(s). The network operation or management device that is located inside or outside the network may be managed and/or operated by a user, consumer, service provider or power utility provider or a governmental entity.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures, wherein.

DETAILED DESCRIPTION

Figure 1:
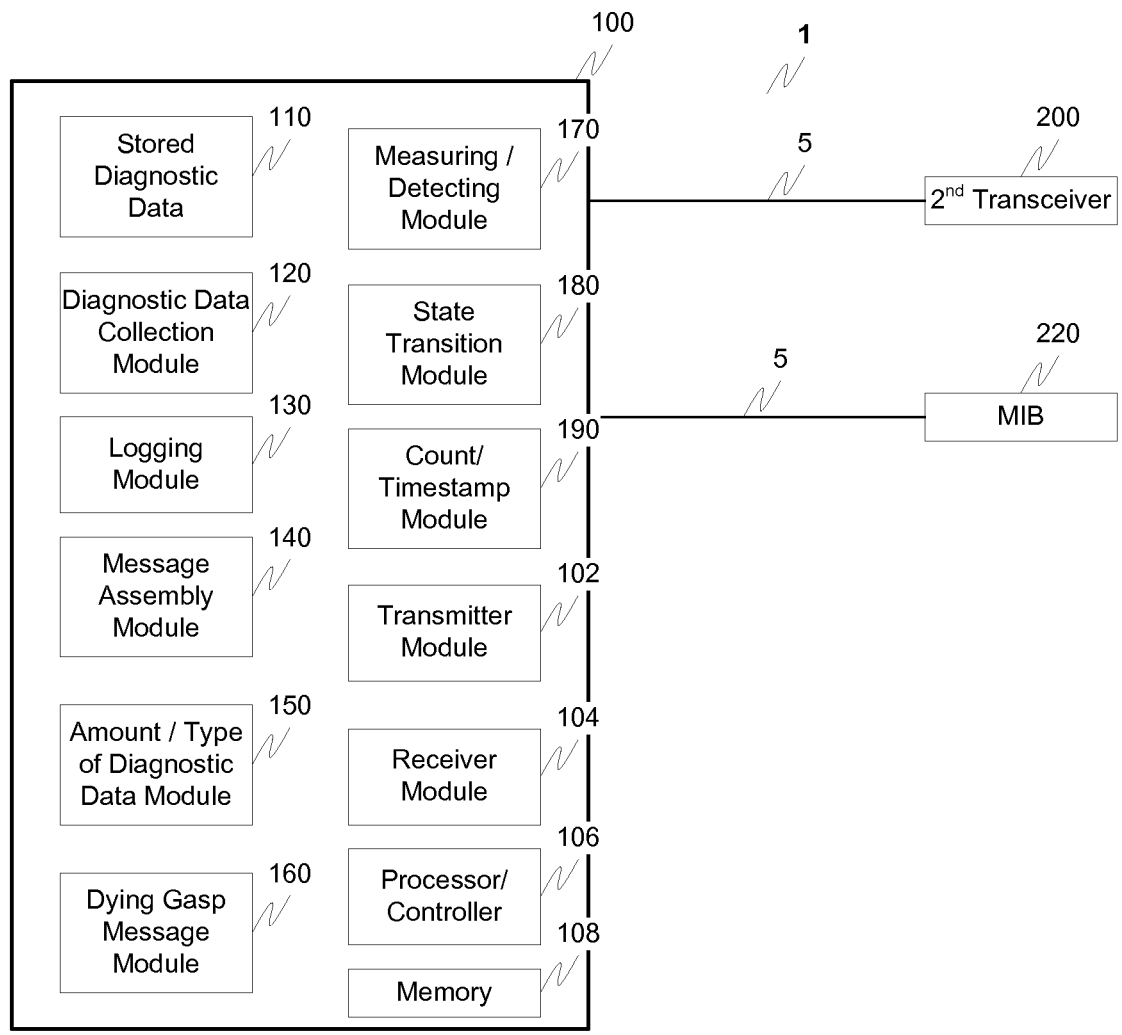
FIG. 1 illustrates an exemplary communications system.

The exemplary embodiments of this invention will be described in relation to communications systems, as well as protocols, techniques, means and methods for communicating forensic diagnostic information, such as in a DSL or multimode multicarrier communications environment, a home network and/or an access network, or in general any communications network operating using any communications protocol(s). Examples of such home or access networks include home powerline networks, access powerline networks, home coaxial cable network, access coaxial cable network, wireless home networks, wireless corporate networks, home telephone networks and access telephone networks. It should be appreciated however that in general, the systems, methods, and techniques disclosed herein will work equally well for other types of communications environments, networks and/or protocols.

The exemplary systems and methods of this invention will also be described in relation to wired or wireless modems/ transceivers and/or a software and/or a hardware testing module, a telecommunications test device, or the like, such as a DSL modem, an ADSL modem, and xDSL modem, a VDSL modem, a line card, a G.hn transceiver, a MOCA transceiver, a Homeplug® transceiver, a power line modem, a wired or wireless modem, test equipment, a multicarrier transceiver, a wireless wide/local area network system, a satellite communications system, a network-based communications systems, such as an IP, Ethernet or ATM system, a modem equipped with diagnostic capabilities, or the like, or a separate programmed general purpose computer having a communications device that is capable of operating in conjunction with any one or more of the following communications protocols: MOCA, G.hn, Homeplug, IEEE 802.11, IEEE 802.3, or the like. However, to avoid unnecessarily obscuring the present invention, the following description omits well-known structures, operations and devices that may be shown in block diagram form or are otherwise summarized or known.

For purposes of explanation, numerous details are set forth in order to provide a thorough understanding of the present invention. It should be appreciated however that the present invention may be practiced in a variety of ways beyond the specific details set forth herein. Furthermore, while the exemplary embodiments illustrated herein show various components of this system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures any one or more aspects of the network or communications environment and/or transceiver(s).

Thus, it should be appreciated that the components of the system can be combined into one or more devices, or split between devices, such as a modem, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), or some combination thereof. Similarly, one or more of the functional portions of the system could be distributed between a modem and an associated computing device/system, and/or in a dedicated test and/or measurement device.

Furthermore, it should be appreciated that the various links 5, including the communications channel(s) connecting the elements can be wired or wireless links or any combination thereof, or any other known or later developed element(s) capable of supplying and/or communicating data to and from the connected elements. The term module as used herein can refer to any known or later developed hardware, software, firmware, or combination thereof, that is capable of performing the functionality associated with that element. The terms determine, calculate, and compute and variations thereof, as used herein are used interchangeable and include any type of methodology, process, technique, mathematical operational or protocol. The terms transceiver and modem are also used interchangeably herein. The terms transmitting modem and transmitting transceiver as well as receiving modem and receiving transceiver are also used interchangeably herein.

The term management interface (e.g., MIB 200) includes any type of interface between a management entity(ies) and/or technician(s) and a transceiver(s), such as, a CO-MIB or CPE-MIB as described, for example, in ITU Standard G.997.1, which is incorporated herein by reference in its entirety.

Moreover, while some of the exemplary embodiments described herein are directed toward a transmitter portion of a transceiver performing certain functions, this disclosure is intended to include corresponding receiver-side functionality in both the same transceiver and/or another transceiver, and vice versa.

FIG. 1 illustrates an exemplary communications environment 1. The communications environment 1, in addition to well known componentry, includes transceiver 100, a second transceiver 200 and MIB 220, interconnected via one or more communications links 5. The transceivers 100 and 200 can include comparable componentry including stored diagnostic data 110, a diagnostic data collection module 120, a logging module 130, a message assembly module 140, an amount/type of diagnostic data module 150, a dying gasp message module 160, a measuring/detecting module 170, a state transition module 180, a count/timestamp module 190, a transmitter module 102, a receiver module 104, processor/controller 106 and memory 108.

Communication of Forensic Diagnostic Data

Communication of forensic data will be described in relation to the communication of the data during certain time periods. These exemplary time periods include:

Communicating During A Subsequent Initialization Or Diagnostic Mode,

Communicating During A Subsequent Showtime, and

Communicating During A Current Showtime.

Communicating During a Subsequent Initialization or Diagnostic Mode

In accordance with one exemplary embodiment, the forensic diagnostic data from a previous Showtime may be communicated from a first transceiver 100 to another transceiver (200 and/or 220) (e.g., a central office transceiver xTU-C or a remote transceiver xTU-R) during an initialization procedure (or initialization state or initialization sequence) that follows exiting from Showtime. For example, and with the cooperation of the message assembly module 140 and transmitter module 102, a message may be sent during initialization indicating at least one of the parameters described above.

The forensic diagnostic data from the previous Showtime may also be communicated from the first transceiver 100 to another transceiver (200 and/or 220) (e.g. a central office transceiver xTU-C or a remote transceiver xTU-R) during a diagnostic mode procedure that follows exiting from Showtime (such as the Diagnostic Mode specified in G.992.3/5 or G.993.2). For example, and with the cooperation of the message assembly module 140 and transmitter module 102, a message may be sent during the diagnostic mode indicating at least one of the parameters described above.

The forensic diagnostic data from the previous Showtime may also be communicated or reported to Management Entity, such as MIB 220. For example, the information may be reported to a service provider associated with the MIB.

As an example, the initialization or diagnostic mode message may contain a bit field that indicates the last N1=10 LOSM, and/or the last N2=10 SEFM, and/or the last N6=10 INSM, etc. For example, a 10 bit field could indicate the last 10 LOSM. In this example, if the bit field indicated 1111000000, this would show that there was a Loss of Signal defect for the last 6 Loss of Signal Measurements prior to exiting Showtime. This means that for the 0.6 seconds prior to exiting Showtime, the average power of the DSL signal was reduced by at least 6 dB relative to the reference power level.

As another example, a 10 bit field could indicate the last 10 SEFM. In this example, if the bit field indicated 1111111100, this would show that there was a SEF defect for the last 2 SEF measurements prior to exiting Showtime. This means that the last 2 Sync Symbols prior to exiting Showtime did not contain the expected content.

As another example, a 10 bit field could indicate the last 10 INSM prior to exiting Showtime. In this example, if the bit field indicated 1100000000, this would show that the last 8 DMT symbols prior to exiting Showtime were severely degraded due to impulse noise or some other problem.

For example, the initialization or diagnostic mode message may contain a bit field that indicates the LastSym and/or the CLOSD and/or the CSEFD, etc. For example, a S=24 bit field could indicate the LastSym (i.e., the SymbolCount of the last DMT symbol received or transmitted prior to exiting Showtime).

As another example, a N21×S bit field could indicate the CLOSD (the SymbolCounts of N21changes of the LOS defect state). If N21=5 and S=24, then the CLOSD parameter would contain five 24-bit SymbolCount values with each SymbolCount indicating a change in the LOS defect state.

As yet another example, a N22×S bit field could indicate the CSEFD (the SymbolCounts of the last N22 changes of the LOS defect state). If N22=5 and S=24, then the CSEFD parameter would contain five 24-bit SymbolCount values with each SymbolCount indicating a change in the SEF defect state.

In operation, the transceiver 100 receives (with the cooperation of the receiver module 104) and/or transmits (with the cooperation of the transmitter module 102) a plurality of multicarrier symbols (or DMT) in a first data transmission state or Showtime state or steady state (first data communication state). Next, and in cooperation with one or more of the stored diagnostic data 110, the measuring/detecting module 170, the state transition module 180, controller 106 and memory 108, the transceiver 100 one or more of determines, stores, measures and detects, prior to exiting the first data communication state, one or more of the following types of diagnostic data:

A plurality of LOS measurements,
A plurality of SEF measurements,
A plurality of SNRM measurements,
A plurality of Impulse Noise Sensor measurements,
A plurality of CRC detections,
A plurality of FEC detections,
A reason for retraining,
A plurality of Errored Second calculations,
A plurality of severely Errored Second calculations,
A plurality of consecutive Errored Second calculations,
A plurality of consecutive severely Errored Second calculations,
A plurality of consecutive LOS measurements,
A plurality of consecutive SEF measurements,
A plurality of consecutive SNRM measurements,
A plurality of consecutive Impulse Noise Sensor measurements,
A plurality of consecutive CRC detections, and
A plurality of consecutive FEC detections.

The transceiver 100 then exits the first data communication state and enters an initialization procedure or diagnostic mode. In the initialization procedure or diagnostic mode, the transceiver 100, transmits to (or receives from) the second transceiver 200 a message, cooperating with the message assembly module 140 and transmitter or receiver module 102/104, during the initialization procedure or diagnostic mode, wherein the message contains information (e.g., a bit field) indicating at least one of the diagnostic data from above. As an option, the transceiver 100 can also provide or report to a management entity, such as MIB 220, information (e.g., a bit field) indicating at least one of the diagnostic data from above.

In accordance with another exemplary embodiment, the transceiver 100 receives (with the cooperation of the receiver module 104) and/or transmits (with the cooperation of the transmitter module 102) a plurality of multicarrier symbols (or DMT) in a first data transmission state or Showtime state or steady state (first data communication state). Next, and in cooperation with the count module 190, a SymbolCount is determined, wherein the SymbolCount is a number that indicates the count of multicarrier symbols received or transmitted over the communications line after entering the first data communication state. Next, and in cooperation with one or more of the stored diagnostic data 110, the measuring/detecting module 170, the state transition module 180, controller 106 and memory 108, the transceiver 100 one or more of determines, stores, measures and detects, prior to exiting the first data communication state, one or more of the following types of diagnostic data:

The SymbolCount of the last DMT symbol received or transmitted prior to exiting Showtime,
The SymbolCount of at least one change of the LOS defect state,
The SymbolCount of at least one change of the SEF defect state,
The SymbolCount of at least one change of the LOM defect state,
The SymbolCount of at least one change of the far-end LOS defect state,
The SymbolCount of at least one change of the RDI defect state,
The SymbolCount of at least one change of the far-end LOM defect state,
The SymbolCount of at least one change of the LOS failure state,
The SymbolCount of at least one change of the LOF failure state,
The SymbolCount of at least one change of the Errored Second state,
The SymbolCount of at least one change of the Severely Errored Second state,
The SymbolCount and/or number of subcarriers of at least one Successful Receiver Bitswap,
The SymbolCount and/or number of subcarriers of at least one Successful Transmitter Bitswap,
The SymbolCount and/or number of subcarriers of at least one Failed Bitswap Request,
The SymbolCount and/or number of subcarriers and/or data rate change of at least one Successful Receiver SRA,
The SymbolCount and/or number of subcarriers and/or data rate change of at least one Successful Transmitter SRA,
The SymbolCount and/or number of subcarriers and/or data rate change of at least one Failed SRA,
The SymbolCount of at least one change in the leftr defect state,
The SymbolCount of at least one changes of the leftr defect Second state,
The SymbolCount of at least one CRC error anomaly,
The SymbolCount of at least one Uncorrected DTU,
The SymbolCount of at least one Retransmitted DTU, The SymbolCount of at least one Corrected DTU, The SymbolCount of at least one change of the Uncorrected DTU Second state, The SymbolCount of at least one change of the Retransmitted DTU Second state, The SymbolCount of at least one change of the Corrected DTU Second state, The SymbolCount of at least one Retransmission request message, The SymbolCount of at least one changes of the Severely Uncorrected DTU Second state, The SymbolCount of at least one change of the Severely Retransmitted DTU Second state, and The SymbolCount of at least one change of the Severely Corrected DTU Second state.

The transceiver 100 then exits the first data communication state and enters an initialization procedure or diagnostic mode. In the initialization procedure or diagnostic mode, the transceiver 100, transmits to (or receives from) the second transceiver 200 a message, cooperating with the message assembly module 140 and transmitter or receiver module 102/104, during the initialization procedure or diagnostic mode, wherein the message contains information (e.g., a bit field) indicating at least one of the diagnostic data from above. As an option, the transceiver 100 can also provide or report to a management entity, such as MIB 220, information (e.g., a bit field) indicating at least one of the diagnostic data from above.

Communicating During a Subsequent Showtime

In accordance with another exemplary embodiment, the forensic diagnostic data from a previous Showtime may be communicated to a second transceiver 200 (e.g., a central office transceiver xTU-C or a remote transceiver xTU-R) and/or a management entity 220 during a subsequent Showtime that follows exiting from a previous Showtime. For example, and in cooperation with the message assembly module 140, a message may be sent during Showtime from a management entity 220 or the second transceiver 200 requesting forensic diagnostic data from a previous Showtime. In response to the message (or autonomously) the transceiver 100 may send a message to the second transceiver 200 indicating at least one of the parameters described above.

The forensic diagnostic data from the previous Showtime may also be communicated or reported to management entity. For example, the information may be reported to a service provider associated with a MIB.

For example, the Showtime message may contain a bit field that indicates the last N1=10 LOSM, and/or the last N2=10 SEFM, and/or the last N6=10 INSM, etc. For example, a 10 bit field could indicate the last 10 LOSM. In this example, if the bit field indicated 1111000000, this would show that there was a Loss of Signal defect for the last 6 Loss of Signal Measurements prior to exiting Showtime. This means that for the 0.6 seconds prior to exiting Showtime the average power of the DSL signal was reduced by at least 6 dB relative to the reference power level.

As another example, a 10 bit field could indicate the last 10 SEFM. In this example, if the bit field indicated 111111100, this would show that there was a SEF defect for the last 2 SEF Measurements prior to exiting Showtime. This means that the last 2 Sync Symbols prior to exiting Showtime did not contain the expected content.

As another example, a 10 bit field could indicate the last 10 INSM prior to exiting Showtime. In this example, if the bit field indicated 1100000000, this would show that the last 8 DMT symbols prior to exiting Showtime were severely degraded due to impulse noise or some other problem.

For example, the Showtime message may contain a bit field that indicates the LastSym and/or the CLOSD and/or the CSEFD, etc. For example, a S=24 bit field could indicate the LastSym (i.e., the SymbolCount of the last DMT symbol received or transmitted prior to exiting Showtime). As another example, a N21×S bit field could indicate the CLOSD (the SymbolCounts of N21changes of the LOS defect state). If N21=5 and S=24, then the CLOSD parameter would contain five 24-bit SymbolCount values with each SymbolCount indicating a change in the LOS defect state. As another example, a N22×S bit field could indicate the CSEFD (the SymbolCounts of the last N22 changes of the LOS defect state). If N22=5 and S=24, then the CSEFD parameter would contain five 24-bit SymbolCount values with each SymbolCount indicating a change in the SEF defect state.

In operation, the transceiver 100 receives (with the cooperation of the receiver module 104) and/or transmits (with the cooperation of the transmitter module 102) a plurality of multicarrier symbols (or DMT) in a first data transmission state or Showtime state or steady state (first data communication state). Next, and in cooperation with one or more of the stored diagnostic data 110, the measuring/detecting module 170, the state transition module 180, controller 106 and memory 108, the transceiver 100 one or more of determines, stores, measures and detects, prior to exiting the first data communication state, one or more of the following diagnostic data:

A plurality of LOS measurements,

A plurality of SEF measurements,

A plurality of SNRM measurements,

A plurality of Impulse Noise Sensor measurements,

A plurality of CRC detections,

A plurality of FEC detections,

A reason for retraining,

A plurality of Errored Second calculations,

A plurality of severely Errored Second calculations,

A plurality of consecutive Errored Second calculations,

A plurality of consecutive severely Errored Second calculations,

A plurality of consecutive LOS measurements,

A plurality of consecutive SEF measurements,

A plurality of consecutive SNRM measurements,

A plurality of consecutive Impulse Noise Sensor measurements,

A plurality of consecutive CRC detections, and

A plurality of consecutive FEC detections.

The transceiver 100 then exits the first data communication state and enters a second data communication state (e.g., a second Showtime). In the second data communication state, the transceiver 100 receives a message from the second transceiver 200 requesting at least one of the diagnostic data from above. The transceiver 100 in the second data communication state transmits, cooperating with the message assembly module 140 and transmitter module 102, to the second transceiver 200 a message, wherein the message contains information (e.g., a bit field) indicating at least one of the diagnostic data from above. As an option, the transceiver 100 can also provide or report to a management entity, such as MIB 220, information (e.g., a bit field) indicating at least one of the diagnostic data from above.

In accordance with another exemplary embodiment, the transceiver 100 receives (with the cooperation of the receiver module 104) and/or transmits (with the cooperation of the transmitter module 102) a plurality of multicarrier symbols (or DMT) in a first data transmission state or Showtime state or steady state (first data communication state).

Next, and in cooperation with the count module 190, a SymbolCount is determined, wherein the SymbolCount is a number that indicates the count of multicarrier symbols received or transmitted over the communications line after entering the first data communication state.

Then, and in cooperation with one or more of the stored diagnostic data 110, the measuring/detecting module 170, the state transition module 180, controller 106 and memory 108, the transceiver 100 one or more of determines, stores, measures and detects, prior to exiting the first data communication state, one or more of the following types of diagnostic data:

The SymbolCount of the last DMT symbol received or transmitted prior to exiting Showtime, The SymbolCount of at least one change of the LOS defect state, The SymbolCount of at least one change of the SEF defect state, The SymbolCount of at least one change of the LOM defect state, The SymbolCount of at least one change of the far-end LOS defect state, The SymbolCount of at least one change of the RDI defect state, The SymbolCount of at least one change of the far-end LOM defect state, The SymbolCount of at least one change of the LOS failure state, The SymbolCount of at least one change of the LOF failure state, The SymbolCount of at least one change of the Errored Second state, The SymbolCount of at least one change of the Severely Errored Second state, The SymbolCount and/or number of subcarriers of at least one Successful Receiver Bitswap, The SymbolCount and/or number of subcarriers of at least one Successful Transmitter Bitswap, The SymbolCount and/or number of subcarriers of at least one Failed Bitswap Request, The SymbolCount and/or number of subcarriers and/or data rate change of at least one Successful Receiver SRA, The SymbolCount and/or number of subcarriers and/or data rate change of at least one Successful Transmitter SRA, The SymbolCount and/or number of subcarriers and/or data rate change of at least one Failed SRA, The SymbolCount of at least one change in the leftr defect state, The SymbolCount of at least one change of the leftr defect Second state, The SymbolCount of at least one CRC error anomaly, The SymbolCount of at least one Uncorrected DTU, The SymbolCount of at least one Retransmitted DTU, The SymbolCount of at least one Corrected DTU, The SymbolCount of at least one change of the Uncorrected DTU Second state, The SymbolCount of at least one change of the Retransmitted DTU Second state, The SymbolCount of at least one change of the Corrected DTU Second state, The SymbolCount of at least one Retransmission request message, The SymbolCount of at least one change of the Severely Uncorrected DTU Second state, The SymbolCount of at least one change of the Severely Retransmitted DTU Second state, and The SymbolCount of at least one change of the Severely Corrected DTU Second state.

The transceiver 100 then exits the first data communication state and enters a second data communication state. In the second data communication state, the transceiver 100 receives a message from the second transceiver 200 requesting at least one of the diagnostic data from above. The transceiver 100, cooperating with the message assembly module 140 and transmitter module 102, during the second data communication state transmits to the second transceiver 200 a message, wherein the message contains information (e.g., a bit field) indicating at least one of the diagnostic data from above. As an option, the transceiver 100 can also provide or report to a management entity, such as MIB 220, information (e.g., a bit field) indicating at least one of the diagnostic data from above.

Communicating During A Current Showtime

In accordance with another exemplary embodiment, diagnostic data from a current Showtime may be communicated from the transceiver 100 to a second transceiver 200 (e.g., a central office transceiver xTU-C or a remote transceiver xTU-R) during the current Showtime. For example, the diagnostic data can be collected using a sliding window (or "trail") that covers the most recently received signals. For example, a message may be sent during Showtime from a management entity 220 or the second transceiver 200 requesting diagnostic data from the current Showtime. In response to the message (or autonomously) the transceiver 100 may send a message to the second transceiver 200 or the management entity 220 indicating at least one of the parameters described above.

The forensic diagnostic data from the current Showtime may also be communicated or reported to management entity. For example, the information may be reported to a service provider associated with the MIB 220.

For example, the Showtime message may contain a bit field that indicates the last $N1=10$ LOSM, and/or the last $N2=10$ SEFM, and/or the last $N6=10$ INSM, etc. For example, a 10 bit field could indicate the last 10 LOSM. In this example, if the bit field indicated 1111000000, this would show that there was a Loss of Signal defect for the last 6 Loss of Signal Measurements prior to exiting Showtime. This means that for the 0.6 seconds prior to exiting Showtime, the average power of the DSL signal was reduced by at least 6 dB relative to the reference power level.

As another example, a 10 bit field could indicate the last 10 SEFM. In this example, if the bit field indicated 111111100, this would show that there was a SEF defect for the last 2 SEF Measurements prior to exiting Showtime. This means that the last 2 Sync Symbols prior to exiting Showtime did not contain the expected content.

As another example, a 10 bit field could indicate the last 10 INSM prior to exiting Showtime. In this example, if the bit field indicated 1100000000, this would show that the last 8 DMT symbols prior to exiting Showtime were severely degraded due to impulse noise or some other problem.

For example, the Showtime message may contain a bit field that indicates the LastSym and/or the CLOSD and/or the CSEFD, etc. For example, a $S=24$ bit field could indicate the LastSym (i.e., the SymbolCount of the last DMT symbol received or transmitted prior to exiting Showtime).

As another example, a $N21 \times S$ bit field could indicate the CLOSD (the SymbolCounts of N21 changes of the LOS defect state). If $N21=5$ and $S=24$, then the CLOSD parameter would contain five 24-bit SymbolCount values with each SymbolCount indicating a change in the LOS defect state. As another example, a $N22 \times S$ bit field could indicate the CSEFD (the SymbolCounts of the last N22 changes of the LOS defect state). If N22=5 and S=24, then the CSEFD parameter would contain five 24-bit SymbolCount values with each Symbol-Count indicating a change in the SEF defect state.

In operation, the transceiver 100 receives (with the cooperation of the receiver module 104) and/or transmits (with the cooperation of the transmitter module 102) a plurality of multicarrier symbols (or DMT) in a first data transmission state or Showtime state or steady state (first data communication state). Next, and in cooperation with one or more of the stored diagnostic data 110, the measuring/detecting module 170, the state transition module 180, controller 106 and memory 108, the transceiver 100 one or more of determines, stores, measures and detects, prior to exiting the first data communication state, one or more of the following diagnostic data:

A plurality of LOS measurements,
A plurality of SEF measurements,
A plurality of SNRM measurements,
A plurality of Impulse Noise Sensor measurements,
A plurality of CRC detections,
A plurality of FEC detections,
A reason for retraining,
A plurality of Errored Second calculations,
A plurality of severely Errored Second calculations,
A plurality of consecutive Errored Second calculations,
A plurality of consecutive severely Errored Second calculations,
A plurality of consecutive LOS measurements,
A plurality of consecutive SEF measurements,
A plurality of consecutive SNRM measurements,
A plurality of consecutive Impulse Noise Sensor measurements,
A plurality of consecutive CRC detections, and
A plurality of consecutive FEC detections.

Next, the transceiver 100 receives a message from the second transceiver 200 requesting at least one of the diagnostic data from above. The transceiver 100 transmits during a second data communication state, and cooperating with the message assembly module 140 and transmitter module 102, to the second transceiver 200 a message, wherein the message contains information (e.g., a bit field) indicating at least one of the diagnostic data from above. As an option, the transceiver 100 can also provide or report to a management entity, such as MIB 220, information (e.g., a bit field) indicating at least one of the diagnostic data from above.

In accordance with another exemplary embodiment, the transceiver 100 receives (with the cooperation of the receiver module 104) and/or transmits (with the cooperation of the transmitter module 102) a plurality of multicarrier symbols (or DMT) in a first data transmission state or Showtime state or steady state (first data communication state).

Next, and in cooperation with the count module 190, a SymbolCount is determined, wherein the SymbolCount is a number that indicates the count of multicarrier symbols received or transmitted over the communications line after entering the first data communication state.

Then, and in cooperation with one or more of the stored diagnostic data 110, the measuring/detecting module 170, the state transition module 180, controller 106 and memory 108, the transceiver 100 one or more of determines, stores, measures and detects, prior to exiting the first data communication state, one or more of the following types of diagnostic data:

The SymbolCount of the last DMT symbol received or transmitted prior to exiting Showtime,
The SymbolCount of at least one change of the LOS defect state,
The SymbolCount of at least one change of the SEF defect state,
The SymbolCount of at least one change of the LOM defect state,
The SymbolCount of at least one change of the far-end LOS defect state,
The SymbolCount of at least one change of the RDI defect state,
The SymbolCount of at least one change of the far-end LOM defect state,
The SymbolCount of at least one change of the LOS failure state,
The SymbolCount of at least one change of the LOF failure state,
The SymbolCount of at least one change of the Errored Second state,
The SymbolCount of at least one change of the Severely Errored Second state,
The SymbolCount and/or number of subcarriers of at least one Successful Receiver Bitswap,
The SymbolCount and/or number of subcarriers of at least one Successful Transmitter Bitswap,
The SymbolCount and/or number of subcarriers of at least one Failed Bitswap Request,
The SymbolCount and/or number of subcarriers and/or data rate change of at least one Successful Receiver SRA,
The SymbolCount and/or number of subcarriers and/or data rate change of at least one Successful Transmitter SRA,
The SymbolCount and/or number of subcarriers and/or data rate change of at least one Failed SRA,
The SymbolCount of at least one change in the leftr defect state,
The SymbolCount of at least one changes of the leftr defect Second state,
The SymbolCount of at least one CRC error anomaly,
The SymbolCount of at least one Uncorrected DTU,
The SymbolCount of at least one Retransmitted DTU,
The SymbolCount of at least one Corrected DTU,
The SymbolCount of at least one change of the Uncorrected DTU Second state,
The SymbolCount of at least one change of the Retransmitted DTU Second state,
The SymbolCount of at least one change of the Corrected DTU Second state,
The SymbolCount of at least one Retransmission request message,
The SymbolCount of at least one change of the Severely Uncorrected DTU Second state,
The SymbolCount of at least one change of the Severely Retransmitted DTU Second state, and
The SymbolCount of at least one change of the Severely Corrected DTU Second state.

Next, the transceiver 100 receives a message from the second transceiver 200 requesting at least one of the diagnostic data from above. The transceiver 100 transmits during a second data communication state, and cooperating with the message assembly module 140 and transmitter module 102, to the second transceiver 200 a message, wherein the message contains information (e.g., a bit field) indicating at least one of the diagnostic data from above. As an option, the transceiver 100 can also provide or report to a management entity, such as MIB 220, information (e.g., a bit field) indicating at least one of the diagnostic data from above.

Modifying The Amount/Type Of Diagnostic Data

In accordance with another exemplary embodiment, one or more of the amount and type of diagnostic data measured (with the cooperation of the diagnostic data collection module 120) or logged (with the cooperation of the logging module 130) is modified by a second transceiver 200 and/or management entity associated with, for example, MIB 220. For example, and in cooperation with one or more of the amount/type of diagnostic data module 150, processor 106 and memory 108, one or more of the integer values N1-N48 could be modified (or updated). For example, and in cooperation with the message assembly module 140, a message could be sent to transceiver 100 from a second transceiver 200 and/or a Management Entity associated with MIB 220 indicating a value for N1 and/or N21 (as used above).

The new value for N1 contained in the message could indicate a new number of last Loss of Signal Measurements (LOSM) to be measured and stored with the cooperation of the measuring/detecting module 170 and stored siagnostic data 110. For example, N1 could be modified from N1=10 (as described in the example above) to N1=100. This would provide more information (i.e., it would increase the reporting window from 1 second to 10 seconds) about the LOSM parameter to enable a better diagnosis of the problem.

The new value for N21 contained in the message would indicate a new number SymbolCount values to be stored for the Change in LOS Defect State (CLOSD). For example, N21 could be modified from N21=5 (as described in the example above) to N1=9. This would provide more information (i.e., it would provide 4 SymbolCount more values indicating when the LOS defect state changed) about the CLOSD parameter to enable a better diagnosis of the problem.

Exemplary benefits to modifying the amount/type of diagnostic data as described above at least include the following:

It enables a management entity to modify the diagnostic parameters based on previous diagnostic data.

If there is a limited or fixed amount of memory for storing the diagnostic parameters, a memory allocation may be moved from one parameter to another if one parameter is providing more important diagnostic information in a particular situation (such as a deployment scenario, region of the world, channel environment, line condition, etc). The allocation of memory could be done by, for example, a Management Entity.

For example, if there was fixed amount of memory and a Management Entity wanted to obtain more information on one particular parameter, e.g., CLOSD, then the Management Entity could increase the value of N21 from a value of N21=5 to a value of N21=9, as described above. At the same time, in order to keep the overall memory requirements the same, the Management Entity could decrease the memory requirement for the CSEFD parameter by changing the value of N22 from a value of N22=5 to a value of N22=1.

Alternatively, for example, if there was fixed amount of memory and the Management Entity wanted to get more information on one particular parameter, e.g., CLOSD, then the Management Entity could increase the value of N21 from a value of N21=5 to a value of N21=10, as described above. At the same time, in order to keep the overall memory requirements the same, the Management Entity could decrease the memory requirement for the CSEFD parameter by changing the value of N22 from a value of N22=5 to a value of N22=0. This means that in this case there would be no measuring and/or storing and/or reporting of CSEFD.

Communicating Using A "Dying Gasp" Type Message

In another exemplary embodiment, the diagnostic data may be communicated to a second transceiver 200 (e.g., a central office transceiver xTU-C or a remote transceiver xTU-R) and/or a management entity associated with MIB 220 using a "Dying Gasp" type message during a current Showtime prior to retraining. For example, the transceiver 100 may send a Dying Gasp message to the second transceiver 200 or the Management Entity associated with MIB 220 indicating at least one of the parameters described above. The Dying Gasp message may be an autonomous message that is sent, for example, prior to retraining. The Dying Gasp message may also be sent using the normal Embedded Operation Channel (EOC) during the current Showtime.

Alternatively, or in addition, the Dying Gasp message may be sent using an alternate robust modulation technique that can be demodulated correctly by a second transceiver in the presence of high noise levels, poor channel conditions, poor clock synchronization, etc. For example, the message may be sent, with the cooperation of the dying gasp message module 160 and transmitter module 102, with a modulation method where each bit in the message is mapped to one or more than DMT symbols. For example, each bit could be mapped to one or more REVERB/SEGUE symbols in ADSL2/2+.

Alternatively, or in addition, differential phase shift keying modulation could be used, where, for example, a bit value of 1 is communicated by transmitting two or more consecutive REVERB symbols or two or more consecutive SEGUE symbols (i.e., no phase change) wherein a bit value of 0 is communicated by transmitting one or more REVERB symbols followed by one or more SEGUE symbols, or by one or more SEGUE symbols followed by one or more REVERB symbol (i.e., a 180 degree phase change).

As an example, the dying gasp message could be used to indicate one of the following reasons for exiting Showtime and retraining:

1. Persistent LOS—mapped to 000→REVERB-REVERB-REVERB-REVERB

2. Persistent LOF—mapped to 100→REVERB-REVERB-SEGUE-REVERB

3. High_BER-hs—mapped to 101→REVERB-REVERB-SEGUE-SEGUE

While the examples above describe using a REVERB/SEGUE signals such as those used in ADSL2/2+ transceivers, any other DMT symbol where a plurality of subcarriers are modulated with a predefined sequence of bits can be used. For example, the O-P-SYNCHRO and R-P-SYNCHRO signals from VDSL2 can be used in place of REVERB and SEGUE.

The dying gasp message could also be transmitted a plurality of times so that a receiving modem could correctly detect the message. One exemplary benefit of differential PSK modulation as described above is that it does not require a coherent detector.

While the description and certain embodiments herein use a SymbolCount as a measure of time reference (or timestamp) for logging certain diagnostic events and/or parameters, other time references could be used such as:

1. Frame count or DMT Frame count which is a number containing (or that indicates) the count of frames or DMT frames received or transmitted after entering Showtime, 2. Superframe count or DMT superframe count which is a number containing (or that indicates or specifies) the count of superframes or DMT superframes received or transmitted after entering Showtime, 3. Overhead frame count or Overhead superframe count which is a number containing (or that indicates or specifies) the count of overhead frames or overhead superframes received or transmitted after entering Showtime, 4. Absolute DTU count which is a number containing (or that indicates) the count of DTU received or transmitted after entering Showtime, and/or 5. Time in seconds (and/or fractions of a second, such as microseconds) starting from the moment of entering Showtime (e.g., the time elapsed after entering Showtime).

Figure 2:
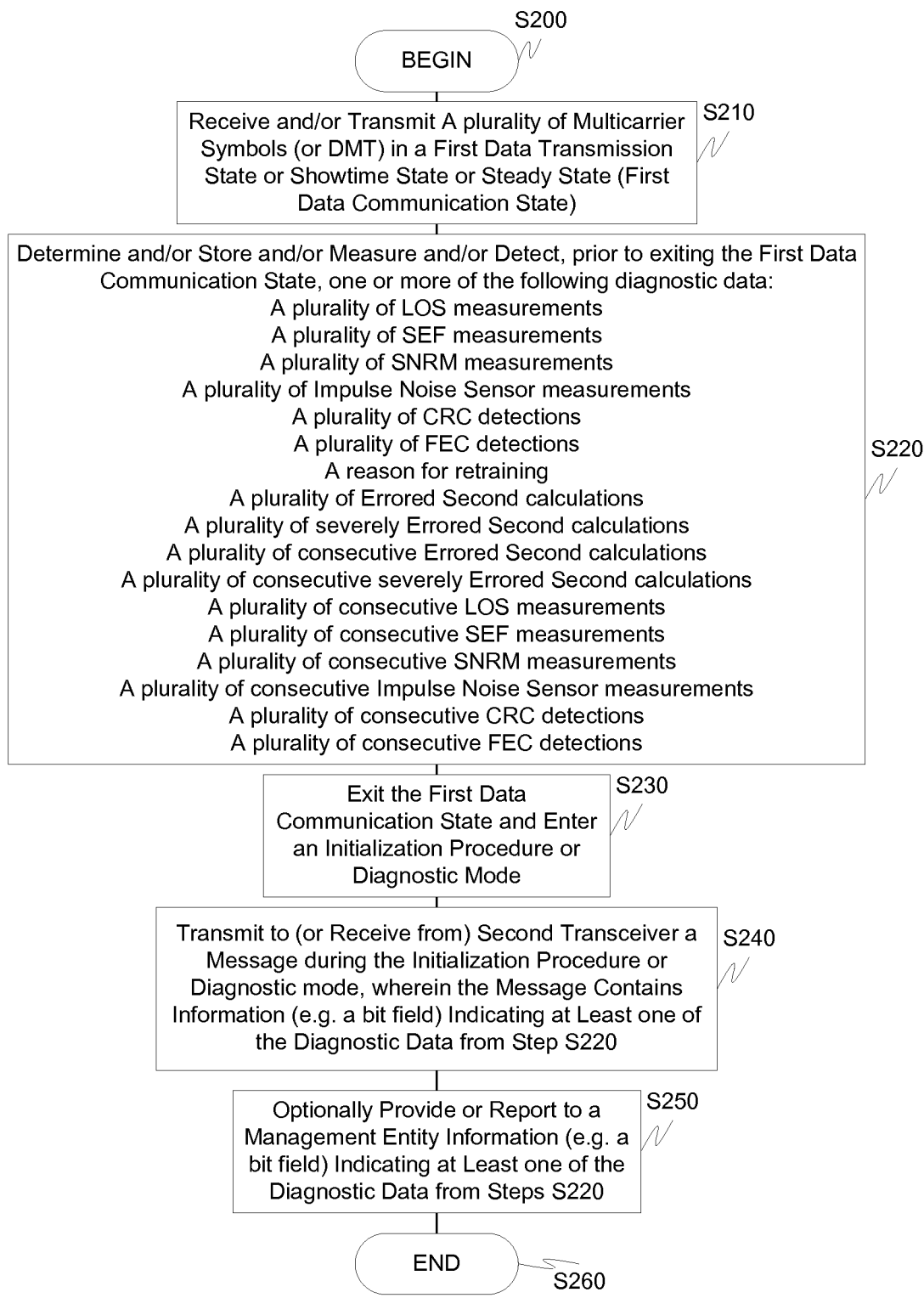
FIG. 2 is a flowchart outlining an exemplary method for communication of forensic data during a subsequent initialization or diagnostic mode.

FIG. 2 outlines an exemplary method for communicating forensic diagnostic information during a subsequent initialization or diagnostic model.

In particular, control begins in step 200 and continues to step S210. In step S210, a transceiver 100 receives and/or transmits a plurality of multicarrier symbols (or DMT) in a first data transmission state or Showtime state or steady state (first data communication state). Next, in step S220, the transceiver one or more of determines, stores, measures and detects, prior to exiting the first data communication state, one or more of the following types of diagnostic data:

A plurality of LOS measurements,
A plurality of SEF measurements,
A plurality of SNRM measurements,
A plurality of Impulse Noise Sensor measurements,
A plurality of CRC detections,
A plurality of FEC detections,
A reason for retraining,
A plurality of Errored Second calculations,
A plurality of severely Errored Second calculations,
A plurality of consecutive Errored Second calculations,
A plurality of consecutive severely Errored Second calculations,
A plurality of consecutive LOS measurements,
A plurality of consecutive SEF measurements,
A plurality of consecutive SNRM measurements,
A plurality of consecutive Impulse Noise Sensor measurements,
A plurality of consecutive CRC detections, and
A plurality of consecutive FEC detections.

Then, in step S230, the transceiver then exits the first data communication state and enters an initialization procedure or diagnostic mode. In the initialization procedure or diagnostic mode in step S240, the transceiver transmits to (or receives from) a second transceiver a message during the initialization procedure or diagnostic mode, wherein the message contains information (e.g., a bit field) indicating at least one of the diagnostic data from above. As an option, the transceiver n step S250 can also provide or report to a management entity information (e.g., a bit field) indicating at least one of the diagnostic data from above. Control then continues to step S260 where the control sequence ends.

Figure 3:
FIG. 3 is a flowchart outlining an exemplary method for communication of forensic data during a subsequent initialization or diagnostic mode using a symbol count.

FIG. 3 outlines another exemplary embodiment for communicating forensic diagnostic information during a subsequent initialization or diagnostic mode. In particular, control begins in step S300 and continues to step S310. In step S310, a transceiver receives and/or transmits a plurality of multicarrier symbols (or DMT) in a first data transmission state or Showtime state or steady state (first data communication state). Next, in step S320, a SymbolCount is determined, wherein the SymbolCount is a number that indicates the count of multicarrier symbols received or transmitted over the communications line after entering the first data communication state. Then, the transceiver one or more of determines, stores, measures and detects, prior to exiting the first data communication state, one or more of the following types of diagnostic data:

The SymbolCount of the last DMT symbol received or transmitted prior to exiting Showtime,
The SymbolCount of at least one change of the LOS defect state,
The SymbolCount of at least one change of the SEF defect state,
The SymbolCount of at least one change of the LOM defect state,
The SymbolCount of at least one change of the far-end LOS defect state,
The SymbolCount of at least one change of the RDI defect state,
The SymbolCount of at least one change of the far-end LOM defect state,
The SymbolCount of at least one change of the LOS failure state,
The SymbolCount of at least one change of the LOF failure state,
The SymbolCount of at least one change of the Errored Second state,
The SymbolCount of at least one change of the Severely Errored Second state,
The SymbolCount and/or number of subcarriers of at least one Successful Receiver Bitswap,
The SymbolCount and/or number of subcarriers of at least one Successful Transmitter Bitswap,
The SymbolCount and/or number of subcarriers of at least one Failed Bitswap Request,
The SymbolCount and/or number of subcarriers and/or data rate change of at least one Successful Receiver SRA,
The SymbolCount and/or number of subcarriers and/or data rate change of at least one Successful Transmitter SRA,
The SymbolCount and/or number of subcarriers and/or data rate change of at least one Failed SRA,
The SymbolCount of at least one change in the leftr defect state,
The SymbolCount of at least one change of the leftr defect Second state,
The SymbolCount of at least one CRC error anomaly,
The SymbolCount of at least one Uncorrected DTU,
The SymbolCount of at least one Retransmitted DTU,
The SymbolCount of at least one Corrected DTU,
The SymbolCount of at least one change of the Uncorrected DTU Second state,
The SymbolCount of at least one change of the Retransmitted DTU Second state,
The SymbolCount of at least one change of the Corrected DTU Second state,
The SymbolCount of at least one Retransmission request message,
The SymbolCount of at least one change of the Severely Uncorrected DTU Second state,
The SymbolCount of at least one change of the Severely Retransmitted DTU Second state, and
The SymbolCount of at least one change of the Severely Corrected DTU Second state.

Control then continues to step S340.

In step S340, the transceiver exits the first data communication state and enters an initialization procedure or diagnostic mode. In the initialization procedure or diagnostic mode, the transceiver transmits to (or receives from) a second transceiver a message during the initialization procedure or diagnostic mode, wherein the message contains information (e.g., a bit field) indicating at least one of the diagnostic data from above. As an option, in step S360, the transceiver can also provide or report to a management entity information (e.g., a bit field) indicating at least one of the diagnostic data from above.

Figure 4:
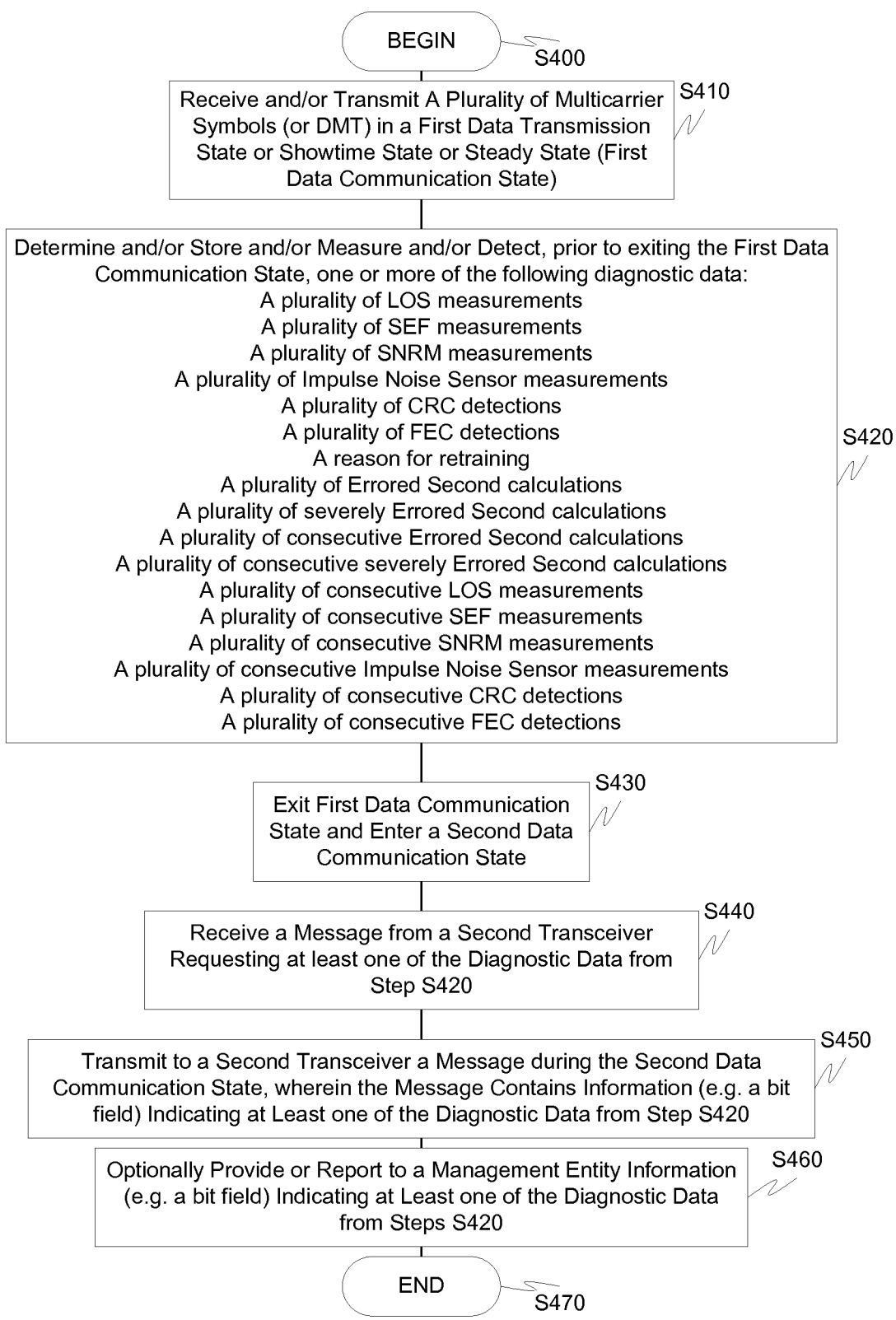
FIG. 4 is a flowchart outlining an exemplary method for communicating forensic diagnostic data from the previous Showtime to a second transceiver and/or a management entity during a subsequent Showtime that follows exiting from a previous Showtime.

FIG. 4 outlines an exemplary method for communicating forensic diagnostic information during a subsequent Showtime. In particular, control begins in step S400 and continues to step S410. In step S410, a transceiver receives and/or transmits a plurality of multicarrier symbols (or DMT) in a first data transmission state or Showtime state or steady state (first data communication state). Next, in step S420, the transceiver one or more of determines, stores, measures and detects, prior to exiting the first data communication state, one or more of the following diagnostic data:

A plurality of LOS measurements,
A plurality of SEF measurements,
A plurality of SNRM measurements,
A plurality of Impulse Noise Sensor measurements,
A plurality of CRC detections,
A plurality of FEC detections,
A reason for retraining,
A plurality of Errored Second calculations,
A plurality of severely Errored Second calculations,
A plurality of consecutive Errored Second calculations,
A plurality of consecutive severely Errored Second calculations,
A plurality of consecutive LOS measurements,
A plurality of consecutive SEF measurements,
A plurality of consecutive SNRM measurements,
A plurality of consecutive Impulse Noise Sensor measurements,
A plurality of consecutive CRC detections, and
A plurality of consecutive FEC detections.

Control then continues to step S430.

In step S430, the transceiver exits the first data communication state and enters a second data communication state (e.g., another Showtime state). In the second data communication state in step S440, the transceiver receives a message from a second transceiver requesting at least one of the diagnostic data from above. Then, in step S450, the transceiver in the second data communication state transmits to the second transceiver a message, wherein the message contains information (e.g., a bit field) indicating at least one of the diagnostic data from above. As an option, in step S460, the transceiver can also provide or report to a management entity information (e.g., a bit field) indicating at least one of the diagnostic data from above.

Control then continues to step S470 where the control sequence ends.

Figure 5:
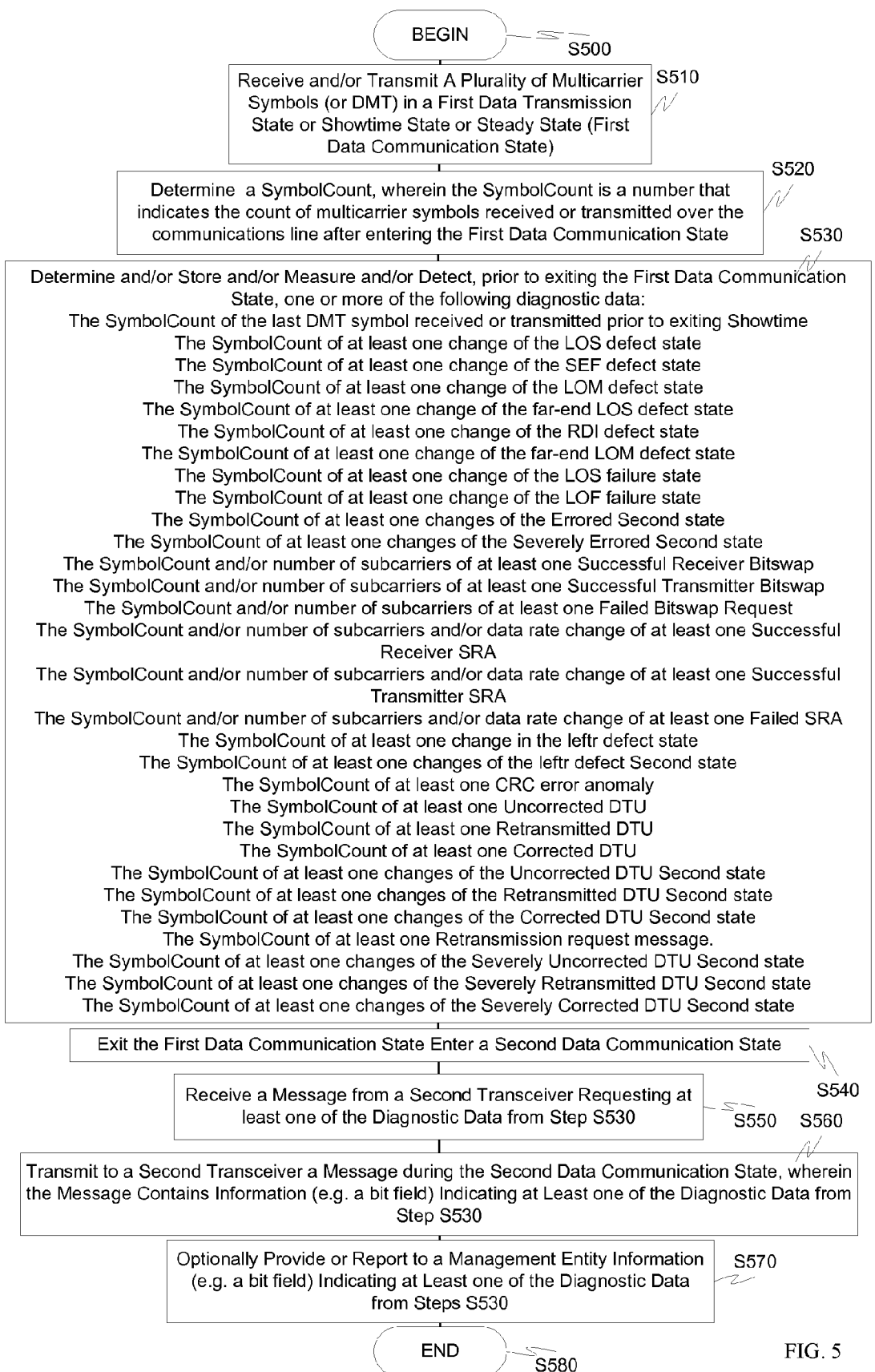
FIG. 5 is a flowchart outlining an exemplary method for communicating forensic diagnostic data from the previous Showtime to a second transceiver and/or a management entity during a subsequent Showtime that follows exiting from a previous Showtime using a symbol count.

FIG. 5 outlines another exemplary method for communicating forensic diagnostic information during a subsequent Showtime. In particular, control begins in step S500 and continues to step S510. In step S510, a transceiver receives and/or transmits a plurality of multicarrier symbols (or DMT) in a first data transmission state or Showtime state or steady state (first data communication state). Next, in step S520, a SymbolCount is determined, wherein the SymbolCount is a number that indicates the count of multicarrier symbols received or transmitted over the communications line after entering the first data communication state. Then, in step S530, the transceiver one or more of determines, stores, measures and detects, prior to exiting the first data communication state, one or more of the following types of diagnostic data:

The SymbolCount of the last DMT symbol received or transmitted prior to exiting Showtime,
The SymbolCount of at least one change of the LOS defect state,
The SymbolCount of at least one change of the SEF defect state,
The SymbolCount of at least one change of the LOM defect state,
The SymbolCount of at least one change of the far-end LOS defect state,
The SymbolCount of at least one change of the RDI defect state,
The SymbolCount of at least one change of the far-end LOM defect state,
The SymbolCount of at least one change of the LOS failure state,
The SymbolCount of at least one change of the LOF failure state,
The SymbolCount of at least one change of the Errored Second state,
The SymbolCount of at least one change of the Severely Errored Second state,
The SymbolCount and/or number of subcarriers of at least one Successful Receiver Bitswap,
The SymbolCount and/or number of subcarriers of at least one Successful Transmitter Bitswap,
The SymbolCount and/or number of subcarriers of at least one Failed Bitswap Request,
The SymbolCount and/or number of subcarriers and/or data rate change of at least one Successful Receiver SRA,
The SymbolCount and/or number of subcarriers and/or data rate change of at least one Successful Transmitter SRA,
The SymbolCount and/or number of subcarriers and/or data rate change of at least one Failed SRA,
The SymbolCount of at least one change in the leftr defect state,
The SymbolCount of at least one change of the leftr defect Second state,
The SymbolCount of at least one CRC error anomaly,
The SymbolCount of at least one Uncorrected DTU,
The SymbolCount of at least one Retransmitted DTU,
The SymbolCount of at least one Corrected DTU,
The SymbolCount of at least one change of the Uncorrected DTU Second state,
The SymbolCount of at least one change of the Retransmitted DTU Second state,
The SymbolCount of at least one change of the Corrected DTU Second state,
The SymbolCount of at least one Retransmission request message,
The SymbolCount of at least one change of the Severely Uncorrected DTU Second state,
The SymbolCount of at least one change of the Severely Retransmitted DTU Second state, and
The SymbolCount of at least one change of the Severely Corrected DTU Second state.

Control then continues to step S540.

In step S540, the transceiver exits the first data communication state and enters a second data communication state. In the second data communication state, in step S550, the transceiver receives a message from a second transceiver requesting at least one of the diagnostic data from above. The transceiver in step S560 then, during the second data communication state, transmits to the second transceiver a message, wherein the message contains information (e.g., a bit field) indicating at least one of the diagnostic data from above. As an option, in step S570, the transceiver can also provide or report to a management entity information (e.g., a bit field) indicating at least one of the diagnostic data from above. Control then continues to step S580 where the control sequence ends.

Figure 6:
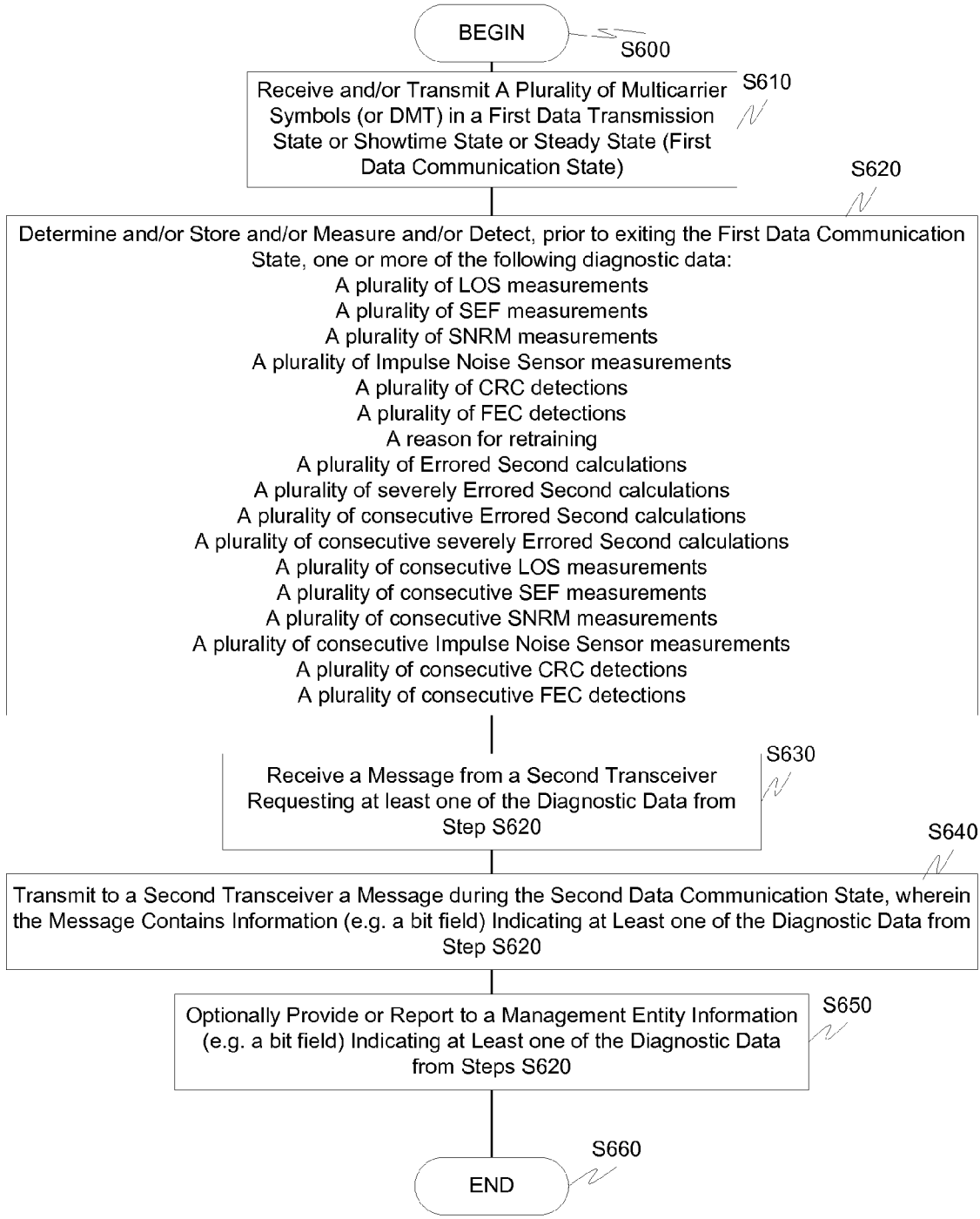
FIG. 6 is a flowchart outlining an exemplary method for communicating diagnostic data from the current Showtime to a second transceiver during the current Showtime.

FIG. 6 outlines an exemplary method for communicating forensic diagnostic information during a current Showtime. In particular, control begins in step S600 and continues to step S610. In step S610, the transceiver receives and/or transmits a plurality of multicarrier symbols (or DMT) in a first data transmission state or Showtime state or steady state (first data communication state). Next, in step S620, the transceiver one or more of determines, stores, measures and detects, prior to exiting the first data communication state, one or more of the following diagnostic data:

A plurality of LOS measurements,
A plurality of SEF measurements,
A plurality of SNRM measurements,
A plurality of Impulse Noise Sensor measurements,
A plurality of CRC detections,
A plurality of FEC detections,
A reason for retraining,
A plurality of Errored Second calculations,
A plurality of severely Errored Second calculations,
A plurality of consecutive Errored Second calculations,
A plurality of consecutive severely Errored Second calculations,
A plurality of consecutive LOS measurements,
A plurality of consecutive SEF measurements,
A plurality of consecutive SNRM measurements,
A plurality of consecutive Impulse Noise Sensor measurements,
A plurality of consecutive CRC detections, and
A plurality of consecutive FEC detections.

Control then continues to step S630.

In step S630, the transceiver receives a message from the second transceiver requesting at least one of the diagnostic data from above. Next, in step S640, the transceiver transmits during a second data communication state to the second transceiver a message, wherein the message contains information (e.g., a bit field) indicating at least one of the diagnostic data from above. As an option, in step S650, the transceiver can also provide or report to a management entity information (e.g., a bit field) indicating at least one of the diagnostic data from above.

Figure 7:
FIG. 7 is a flowchart outlining an exemplary method for communicating diagnostic data from the current Showtime to a second transceiver during the current Showtime using a symbol count.

FIG. 7 outlines another exemplary embodiment communicating forensic diagnostic information during a Current Showtime. In particular, control begins in step S700 and continues to step S710. In step S710, the transceiver receives and/or transmits a plurality of multicarrier symbols (or DMT) in a first data transmission state or Showtime state or steady state (first data communication state).

Next, in step S720, a SymbolCount is determined, wherein the SymbolCount is a number that indicates the count of multicarrier symbols received or transmitted over the communications line after entering the first data communication state.

Then, in step S730, the transceiver one or more of determines, stores, measures and detects, prior to exiting the first data communication state, one or more of the following types of diagnostic data:

The SymbolCount of the last DMT symbol received or transmitted prior to exiting Showtime,
The SymbolCount of at least one change of the LOS defect state,
The SymbolCount of at least one change of the SEF defect state,
The SymbolCount of at least one change of the LOM defect state,
The SymbolCount of at least one change of the far-end LOS defect state,
The SymbolCount of at least one change of the RDI defect state,
The SymbolCount of at least one change of the far-end LOM defect state,
The SymbolCount of at least one change of the LOS failure state,
The SymbolCount of at least one change of the LOF failure state,
The SymbolCount of at least one change of the Errored Second state,
The SymbolCount of at least one change of the Severely Errored Second state,
The SymbolCount and/or number of subcarriers of at least one Successful Receiver Bitswap,
The SymbolCount and/or number of subcarriers of at least one Successful Transmitter Bitswap,
The SymbolCount and/or number of subcarriers of at least one Failed Bitswap Request,
The SymbolCount and/or number of subcarriers and/or data rate change of at least one Successful Receiver SRA,
The SymbolCount and/or number of subcarriers and/or data rate change of at least one Successful Transmitter SRA,
The SymbolCount and/or number of subcarriers and/or data rate change of at least one Failed SRA,
The SymbolCount of at least one change in the leftr defect state,
The SymbolCount of at least one changes of the leftr defect Second state,
The SymbolCount of at least one CRC error anomaly,
The SymbolCount of at least one Uncorrected DTU,
The SymbolCount of at least one Retransmitted DTU,
The SymbolCount of at least one Corrected DTU,
The SymbolCount of at least one change of the Uncorrected DTU Second state,
The SymbolCount of at least one change of the Retransmitted DTU Second state,
The SymbolCount of at least one change of the Corrected DTU Second state,
The SymbolCount of at least one Retransmission request message,
The SymbolCount of at least one change of the Severely Uncorrected DTU Second state,
The SymbolCount of at least one change of the Severely Retransmitted DTU Second state, and
The SymbolCount of at least one change of the Severely Corrected DTU Second state.

Control then Continues to Step S740.

In step S740, the transceiver receives a message from the second transceiver requesting at least one of the diagnostic data from above. The transceiver in step S750 then transmits during a second data communication state to the second transceiver a message, wherein the message contains information (e.g., a bit field) indicating at least one of the diagnostic data from above. As an option, in step S760, the transceiver can also provide or report to a management entity information (e.g., a bit field) indicating at least one of the diagnostic data from above. Control then continues to step S770 where the control sequence ends.

Figure 8:
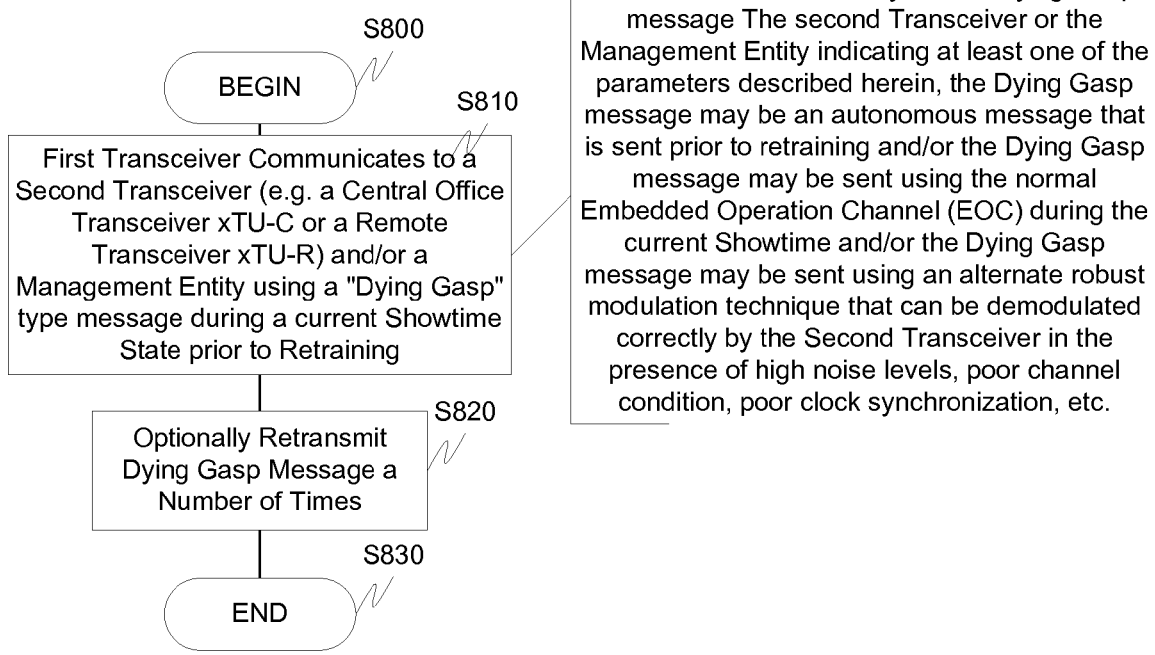
FIG. 8 is a flowchart outlining an exemplary method for communicating diagnostic data to a second transceiver and/or a management entity using a "Dying Gasp" type message.

FIG. 8 outlines an exemplary method for communicating using a "Dying Gasp" type of message. In particular, control begins in step S800 and continues to step S810. In step S810, the diagnostic data may be communicated to a second transceiver (e.g., a central office transceiver xTU-C or a remote transceiver xTU-R) and/or a management entity using a "Dying Gasp" type message during a current Showtime prior to retraining. Next, in step S820 the dying gasp message could optionally also be transmitted a plurality of times so that a receiving modem could correctly detect the message. Control then continues to step S830 where the control sequence ends.

As used herein the terms network and domain have the same meaning and are used interchangeably. The terms subcarrier, subchannel and tone also have the same meaning and are used interchangeably in the description. Also, the terms receiver, receiving node and receiving transceiver have the same meaning and are used interchangeably. Similarly, the terms transmitter, transmitting node and transmitting transceiver have the same meaning and are used interchangeably.

The terms transceiver and modem also have the same meaning and are used interchangeably. While the term home network has been used in this description, the description is not limited to home networks but in fact applies also to any network, such as enterprise networks, business networks, or any network with a plurality of connected nodes. The terms transceiver, node and modem have the same meaning and are used interchangeably in the description. The term frame and packet have the same meaning and are used interchangeably in the description. The term header and PHY-frame header have the same meaning and are used interchangeably in the description.

The terms network and home network have the same meaning and are used interchangeably in the description. While the term Home network has been used in this description, the description is not limited to home networks but in fact applies also to any network, such as enterprise networks, business networks, or any network with a plurality of connected nodes.

While the above-described methods and systems were described in relation to a transceiver, they can also be implemented in a dedicated module such as a test or network optimization module.

The above-described methods and systems and can be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug® or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable means, or the like. In general, any device (or one or more equivalent means) capable of implementing a state machine that is in turn capable of implementing the methodology illustrated herein can be used to implement the various communication/measurement methods, protocols and techniques according to this invention.

Furthermore, the disclosed methods may be readily implemented in software stored on a non-transitory computer-readable information storage media using, for example, object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a computer-readable storage medium, executed on programmed general-purpose computer with the cooperation of a controller and memory, a special purpose computer, a microprocessor, or the like. The systems and methods of this invention can be implemented as a program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a test/modem device.

While the invention is described in terms of exemplary embodiments, it should be appreciated that individual aspects of the invention could be separately claimed and one or more of the features of the various embodiments can be combined.

While the exemplary embodiments illustrated herein discuss the various components collocated, it is to be appreciated that the various components of the system can be located a distant portions of a distributed network, such as a telecommunications network and/or the Internet or within a dedicated communications network. Thus, it should be appreciated that the components of the system can be combined into one or more devices or collocated on a particular node of a distributed network, such as a telecommunications network. As will be appreciated from the following description, and for reasons of computational efficiency, the components of the communications network can be arranged at any location within the distributed network without affecting the operation of the system.

It is therefore apparent that there has been provided, in accordance with the present invention, systems and methods for communicating forensic diagnostic data. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method comprising:
receiving or transmitting, by a Digital Subscriber Line (DSL) transceiver, a plurality of multicarrier symbols in a first data communication state, wherein the first data communication state is a data transmission state, a Showtime state or steady state transmission;
determining a SymbolCount, wherein the SymbolCount is a value that indicates a number of multicarrier symbols received or transmitted over a communication line after entering the first data communication state;
one or more of determining, storing, measuring and detecting, prior to exiting the first data communication state, two or more of following diagnostic data:
a SymbolCount of a value of a last DMT (Discrete Multitone Modulation) symbol received or transmitted prior to exiting Showtime,
a SymbolCount of a value of at least one change of a LOS (Loss of Signal) defect state, a SymbolCount of a value of at least one change of a SEF (Severely Errored Frame) defect state,
a SymbolCount of a value of at least one change of a LOM (Loss of Margin) defect state,
a SymbolCount of a value of at least one change of a far-end LOS defect state,
a SymbolCount of a value of at least one change of an RDI (Remote Defect Indication) defect state,
a SymbolCount of a value of at least one change of a far-end LOM defect state,
a SymbolCount of a value of at least one change of a LOS failure state,
a SymbolCount of a value of at least one change of a LOF (Loss of Frame) failure state,
a SymbolCount of a value of at least one change of an Errored Second state,
a SymbolCount of a value of at least one change of a Severely Errored Second state,
one or more of a SymbolCount of a value and number of subcarriers of at least one Successful Receiver Bitswap,
one or more of a SymbolCount of a value and number of subcarriers of at least one Successful Transmitter Bitswap,
one or more of a SymbolCount of a value and number of subcarriers of at least one Failed Bitswap Request,
one or more of a SymbolCount of a value and number of subcarriers and/or data rate change of at least one Successful Receiver SRA (Seamless Rate Adaptation),
one or more of a SymbolCount of a value, a number of subcarriers and a data rate change of at least one Successful Transmitter SRA,
one or more of a SymbolCount of a value, a number of subcarriers and a data rate change of at least one Failed SRA,
a SymbolCount of a value of at least one change in a LEFTR (Low Error-Free Throughput Rate) defect state,
a SymbolCount of a value of at least one change of a LEFTR defect Second state,
a SymbolCount of a value of at least one change of an Uncorrected DTU (Data Transmission Unit) Second state,
a SymbolCount of a value of at least one change of a Retransmitted DTU Second state,
a SymbolCount of a value of at least one change of a Corrected DTU Second state,
a SymbolCount of a value of at least one Retransmission request message,
a SymbolCount of a value of at least one change of a Severely Uncorrected DTU Second state,
a SymbolCount of a value of at least one change of a Severely Retransmitted DTU Second state, and
a SymbolCount of a value of at least one change of a Severely Corrected DTU Second state,
exiting the first data communication state and entering a second data communication state; and
transmitting a message, wherein the message contains information indicating at least two of the diagnostic data.

2. A method comprising:
receiving or transmitting, by a Digital Subscriber Line (DSL) transceiver, a plurality of multicarrier symbols in a first data communication state, wherein the first data communication state is a data transmission state, a Showtime state or steady state transmission;
determining a SymbolCount, wherein the SymbolCount is a value that indicates a number of multicarrier symbols received or transmitted over a communication line after entering the first data communication state;
receiving a message comprising two or more of following diagnostic data:
a SymbolCount of a value of a last DMT (Discrete Multitone Modulation) symbol received or transmitted prior to exiting Showtime,
a SymbolCount of a value of at least one change of a LOS (Loss of Signal) defect state,
a SymbolCount of a value of at least one change of a SEF (Severely Errored Frame) defect state,
a SymbolCount of a value of at least one change of a LOM (Loss of Margin) defect state,
a SymbolCount of a value of at least one change of a far-end LOS defect state,
a SymbolCount of a value of at least one change of an RDI (Remote Defect Indication) defect state,
a SymbolCount of a value of at least one change of a far-end LOM defect state,
a SymbolCount of a value of at least one change of a LOS failure state,
a SymbolCount of a value of at least one change of a LOF (Loss of Frame) failure state,
a SymbolCount of a value of at least one change of an Errored Second state,
a SymbolCount of a value of at least one change of a Severely Errored Second state,
one or more of a SymbolCount of a value and a number of subcarriers of at least one Successful Receiver Bitswap,
one or more of a SymbolCount of a value and number of subcarriers of at least one Successful Transmitter Bitswap,
one or more of a SymbolCount of a value and number of subcarriers of at least one Failed Bitswap Request,
one or more of a SymbolCount of a value, a number of subcarriers and data rate change of at least one Successful Receiver SRA (Seamless Rate Adaptation),
one or more of a SymbolCount of a value, a number of subcarriers and data rate change of at least one Successful Transmitter SRA,
one or more of a SymbolCount of a value, a number of subcarriers and data rate change of at least one Failed SRA,
a SymbolCount of a value of at least one change in a LEFTR (Low Error-Free Throughput Rate) defect state,
a SymbolCount of a value of at least one change of a LEFTR defect Second state,
a SymbolCount of a value of at least one change of an Uncorrected DTU (Data Transmission Unit) Second state,
a SymbolCount of a value of at least one change of a Retransmitted DTU Second state,
a SymbolCount of a value of at least one change of a Corrected DTU Second state,
a SymbolCount of a value of at least one Retransmission request message,
a SymbolCount of a value of at least one change of a Severely Uncorrected DTU Second state,
a SymbolCount of a value of at least one change of the-a Severely Retransmitted DTU Second state, and
a SymbolCount of a value of at least one change of a Severely Corrected DTU Second state; and exiting the first data communication state and entering a second data communication state.

3. The method of claim 1, wherein the message is transmitted during an initialization or diagnostic mode after exiting the first data communication state.

4. The method of claim 1, wherein the message is transmitted during the second data communication state after exiting the first data communication state.

5. The method of claim 1, wherein the message is transmitted in the first data communication state.

6. The method of claim 1, wherein at least one of diagnostic data is reported to a management entity or a MIB (Management Information Base).

7. The method of claim 1, wherein the second data communication state is a data transmission state, a Showtime state or steady state transmission.

8. A method comprising:
receiving or transmitting, by a Digital Subscriber Line (DSL) transceiver, a plurality of multicarrier symbols in a first data communication state, wherein the first data communication state is a data transmission state, a Showtime state or steady state transmission;
determining a timestamp, wherein the timestamp is a count of elapsed time after entering the first data communication state;
one or more of determining, storing, measuring and detecting, prior to exiting the first data communication, two or more of following diagnostic data:
a timestamp of a last DMT (Discrete Multitone Modulation) symbol received or transmitted prior to exiting Showtime,
a timestamp of at least one change of a LOS (Loss of Signal) defect state,
a timestamp of at least one change of a SEF (Severely Errored Frame) defect state,
a timestamp of at least one change of a LOM (Loss of Margin) defect state,
a timestamp of at least one change of a far-end LOS defect state,
a timestamp of at least one change of an RDI (Remote Defect Indication) defect state,
a timestamp of at least one change of a far-end LOM defect state,
a timestamp of at least one change of a LOS failure state,
a timestamp of at least one change of a LOF (Loss of Frame) failure state,
a timestamp of at least one change of an Errored Second state,
a timestamp of at least one change of a Severely Errored Second state,
one or more of a timestamp and a number of subcarriers of at least one Successful Receiver Bitswap,
one or more of a timestamp and number of subcarriers of at least one Successful Transmitter Bitswap,
one or more of a timestamp and number of subcarriers of at least one Failed Bitswap Request,
one or more of a timestamp, a number of subcarriers and data rate change of at least one Successful Receiver SRA (Seamless Rate Adaptation),
one or more of a timestamp, a number of subcarriers and data rate change of at least one Successful Transmitter SRA,
one or more of a timestamp, a number of subcarriers and data rate change of at least one Failed SRA,
a timestamp of at least one change in a LEFTR (Low Error-Free Throughput Rate) defect state, a timestamp of at least one change of a LEFTR defect Second state,
a timestamp of at least one change of an Uncorrected DTU (Data Transmission Unit) Second state,
a timestamp of at least one change of a Retransmitted DTU Second state,
a timestamp of at least one change of a Corrected DTU Second state,
a timestamp of at least one Retransmission request message,
a timestamp of at least one change of a Severely Uncorrected DTU Second state,
a timestamp of at least one change of the-a Severely Retransmitted DTU Second state, and
a timestamp of at least one change of a Severely Corrected DTU Second state;
exiting the first data communication state and entering a second data communication state; and
transmitting a message, wherein the message contains information indicating at least two of the diagnostic data.

9. A method comprising:
receiving or transmitting, by a Digital Subscriber Line (DSL) transceiver, a plurality of multicarrier symbols in a first data communication state, wherein the first data communication state is a data transmission state, a Showtime state or steady state transmission;
determining a timestamp, wherein the timestamp is a count of elapsed time after entering the first data communication state;
receiving a message comprising two or more of following diagnostic data:
a timestamp of a last DMT (Discrete Multitone Modulation) symbol received or transmitted prior to exiting Showtime,
a timestamp of at least one change of a LOS (Loss of Signal) defect state,
a timestamp of at least one change of a SEF (Severely Errored Frame) defect state,
a timestamp of at least one change of a LOM (Loss of Margin) defect state,
a timestamp of at least one change of a far-end LOS defect state,
a timestamp of at least one change of an RDI (Remote Defect Indication) defect state,
a timestamp of at least one change of a far-end LOM defect state,
a timestamp of at least one change of a LOS failure state,
a timestamp of at least one change of a LOF (Loss of Frame) failure state,
a timestamp of at least one change of an Errored Second state,
a timestamp of at least one change of a Severely Errored Second state,
one or more of a timestamp and a number of subcarriers of at least one Successful Receiver Bitswap,
one or more of a timestamp and a number of subcarriers of at least one Successful Transmitter Bitswap,
one or more of a timestamp and a number of subcarriers of at least one Failed Bitswap Request,
one or more of a timestamp, number of subcarriers and data rate change of at least one Successful Receiver SRA (Seamless Rate Adaptation),
one or more of a timestamp, number of subcarriers and data rate change of at least one Successful Transmitter SRA, one or more of a timestamp, number of subcarriers and data rate change of at least one Failed SRA, a timestamp of at least one change in a LEFTR (Low Error-Free Throughput Rate) defect state, a timestamp of at least one change of a LEFTR defect Second state, a timestamp of at least one change of an Uncorrected DTU (Data Transmission Unit) Second state, a timestamp of at least one change of a Retransmitted DTU Second state, a timestamp of at least one change of a Corrected DTU Second state, a timestamp of at least one Retransmission request message, a timestamp of at least one change of a Severely Uncorrected DTU Second state, a timestamp of at least one change of the-a Severely Retransmitted DTU Second state, and a timestamp of at least one change of a Severely Corrected DTU Second state; and exiting the first data communication state and entering a second data communication state.

10. The method of claim 8, wherein the message is transmitted during an initialization or diagnostic mode after exiting the first data communication state.

11. The method of claim 8, wherein the message is transmitted during the second data communication state after exiting the first data communication state.

12. The method of claim 8, wherein the message is transmitted in the first data communication state.

13. The method of claim 8, wherein at least one of diagnostic data is reported to a management entity or a MIB (Management Information Base).

14. The method of claim 8, wherein the second data communication state is a data transmission state, a Showtime state or steady state transmission.

15. The method of claim 8, wherein the elapsed time is measured in seconds or fractions of seconds.

16. A non-transitory computer-readable information storage media having instructions stored thereon, that if executed by a processor, cause to be performed the method steps in claim 1.

17. A system comprising:

a transmitter module configured to transmit or a receiver module configured to receive a plurality of multicarrier symbols in a first data communication state of a Digital Subscriber Line (DSL) modem, wherein the first data communication state is a data transmission state, a Showtime state or steady state transmission;

a count module configured to determine a SymbolCount, wherein the SymbolCount is a value that indicates a number of multicarrier symbols received or transmitted over a communication line after entering the first data communication state;

one or more of a diagnostic data collection module and a measuring module configured to at least one of determining, storing, measuring and detecting, prior to exiting the first data communication state, two or more of following diagnostic data:

a SymbolCount of a value of a last DMT (Discrete Multitone Modulation) symbol received or transmitted prior to exiting Showtime, a SymbolCount of a value of at least one change of a LOS (Loss of Signal) defect state, a SymbolCount of a value of at least one change of a SEF (Severely Errored Frame) defect state, a SymbolCount of a value of at least one change of a LOM (Loss of Margin) defect state, a SymbolCount of a value of at least one change of a far-end LOS defect state, a SymbolCount of a value of at least one change of an RDI (Remote Defect Indication) defect state, a SymbolCount of a value of at least one change of a far-end LOM defect state, a SymbolCount of a value of at least one change of a LOS failure state, a SymbolCount of a value of at least one change of a LOF (Loss of Frame) failure state, a SymbolCount of a value of at least one change of an Errored Second state, a SymbolCount of a value of at least one change of a Severely Errored Second state, one or more of a SymbolCount of a value and number of subcarriers of at least one Successful Receiver Bitswap, one or more of a SymbolCount of a value and number of subcarriers of at least one Successful Transmitter Bitswap, one or more of a SymbolCount of a value and number of subcarriers of at least one Failed Bitswap Request, one or more of a SymbolCount of a value and number of subcarriers and/or data rate change of at least one Successful Receiver SRA (Seamless Rate Adaptation), one or more of a SymbolCount of a value, a number of subcarriers and a data rate change of at least one Successful Transmitter SRA, one or more of a SymbolCount of a value, a number of subcarriers and a data rate change of at least one Failed SRA, a SymbolCount of a value of at least one change in a LEFTR (Low Error-Free Throughput Rate) defect state, a SymbolCount of a value of at least one change of a LEFTR defect Second state, a SymbolCount of a value of at least one change of an Uncorrected DTU (Data Transmission Unit) Second state, a SymbolCount of a value of at least one change of a Retransmitted DTU Second state, a SymbolCount of a value of at least one change of a Corrected DTU Second state, a SymbolCount of a value of at least one Retransmission request message, a SymbolCount of a value of at least one change of a Severely Uncorrected DTU Second state, a SymbolCount of a value of at least one change of a Severely Retransmitted DTU Second state, and a SymbolCount of a value of at least one change of a Severely Corrected DTU Second state, a state transition module configured to exit the first data communication state and enter a second data communication state; and a message assembly module configured to transmit a message, wherein the message contains information indicating at least two of the diagnostic data.

18. The system of claim 17, wherein the message is transmitted during an initialization or diagnostic mode after exiting the first data communication state.

19. The system of claim 17, wherein the message is transmitted during the second data communication state after exiting the first data communication state.

20. The system of claim 17, wherein the message is transmitted in the first data communication state.

21. The system of claim 17, wherein at least one of diagnostic data is reported to a management entity or a MIB (Management Information Base).

22. The system of claim 17, wherein the second data communication state is a data transmission state, a Showtime state or steady state transmission.

23. A system comprising:
a receiver module configured to receive or a transmitter module configured to transmit a plurality of multicarrier symbols in a first data communication state of a Digital Subscriber Line (DSL) modem, wherein the first data communication state is a data transmission state, a Showtime state or steady state transmission;
a timestamp module configured to determine a timestamp, wherein the timestamp is a count of elapsed time after entering the first data communication state;
one or more of a diagnostic data collection module and a measuring module configured to at least one of determining, storing, measuring and detecting, prior to exiting the first data communication, two or more of following diagnostic data:
  a timestamp of a last DMT (Discrete Multitone Modulation) symbol received or transmitted prior to exiting Showtime,
  a timestamp of at least one change of a LOS (Loss of Signal) defect state,
  a timestamp of at least one change of a SEF (Severely Errored Frame) defect state,
  a timestamp of at least one change of a LOM (Loss of Margin) defect state,
  a timestamp of at least one change of a far-end LOS defect state,
  a timestamp of at least one change of an RDI (Remote Defect Indication) defect state,
  a timestamp of at least one change of a far-end LOM defect state,
  a timestamp of at least one change of a LOS failure state,
  a timestamp of at least one change of a LOF (Loss of Frame) failure state,
  a timestamp of at least one change of an Errored Second state,
  a timestamp of at least one change of a Severely Errored Second state,
  one or more of a timestamp and a number of subcarriers of at least one Successful Receiver Bitswap,
  one or more of a timestamp and number of subcarriers of at least one Successful Transmitter Bitswap,
  one or more of a timestamp and number of subcarriers of at least one Failed Bitswap Request,
  one or more of a timestamp, a number of subcarriers and data rate change of at least one Successful Receiver SRA(Seamless Rate Adaptation),
  one or more of a timestamp, a number of subcarriers and data rate change of at least one Successful Transmitter SRA,
  one or more of a timestamp, a number of subcarriers and data rate change of at least one Failed SRA,
  a timestamp of at least one change in a LEFTR (Low Error-Free Throughput Rate) defect state,
  a timestamp of at least one change of a LEFTR defect Second state,
  a timestamp of at least one change of an Uncorrected DTU (Data Transmission Unit) Second state,
  a timestamp of at least one change of a Retransmitted DTU Second state,
  a timestamp of at least one change of a Corrected DTU Second state,
  a timestamp of at least one Retransmission request message,
  a timestamp of at least one change of a Severely Uncorrected DTU Second state,
  a timestamp of at least one change of a Severely Retransmitted DTU Second state, and
  a timestamp of at least one change of a Severely Corrected DTU Second state;
a state transition module configured to exit the first data communication state and enter a second data communication state; and
a message assembly module configured to transmit a message, wherein the message contains information indicating at least two of the diagnostic data.

24. The system of claim 23, wherein the message is transmitted during an initialization or diagnostic mode after exiting the first data communication state.

25. The system of claim 23, wherein the message is transmitted during the second data communication state after exiting the first data communication state.

26. The system of claim 23, wherein the message is transmitted in the first data communication state.

27. The system of claim 23, wherein at least one of diagnostic data is reported to a management entity or a MIB (Management Information Base).

28. The system of claim 23, wherein the second data communication state is a data transmission state, a Showtime state or steady state transmission.

29. The system of claim 23, wherein the elapsed time is measured in seconds or fractions of seconds.

30. A system comprising:
a transmitter module configured to transmit or a receiver module configured to receive a plurality of multicarrier symbols in a first data communication state, wherein the first data communication state is a data transmission state, a Showtime state or steady state transmission;
a count module configured to determine a SymbolCount, wherein the SymbolCount is a value that indicates a number of multicarrier symbols received or transmitted over a communication line after entering the first data communication state;
one or more of a diagnostic data collection module and a measuring module configured to at least one of determining, storing, measuring and detecting, prior to exiting the first data communication state, three or more of following diagnostic data:
  a SymbolCount of a value of a last DMT (Discrete Multitone Modulation) symbol received or transmitted prior to exiting Showtime,
  a SymbolCount of a value of at least one change of a LOS (Loss of Signal) defect state,
  a SymbolCount of a value of at least one change of a SEF (Severely Errored Frame) defect state,
  a SymbolCount of a value of at least one change of a LOM (Loss of Margin) defect state,
  a SymbolCount of a value of at least one change of a far-end LOS defect state,
  a SymbolCount of a value of at least one change of an RDI (Remote Defect Indication) defect state,
  a SymbolCount of a value of at least one change of a far-end LOM defect state,
  a SymbolCount of a value of at least one change of a LOS failure state,
  a SymbolCount of a value of at least one change of a LOF (Loss of Frame) failure state, a SymbolCount of a value of at least one change of an Errored Second state, a SymbolCount of a value of at least one change of a Severely Errored Second state, one or more of a SymbolCount of a value and number of subcarriers of at least one Successful Receiver Bitswap, one or more of a SymbolCount of a value and number of subcarriers of at least one Successful Transmitter Bitswap, one or more of a SymbolCount of a value and number of subcarriers of at least one Failed Bitswap Request, one or more of a SymbolCount of a value and number of subcarriers and/or data rate change of at least one Successful Receiver SRA (Seamless Rate Adaptation), one or more of a SymbolCount of a value, a number of subcarriers and a data rate change of at least one Successful Transmitter SRA, one or more of a SymbolCount of a value, a number of subcarriers and a data rate change of at least one Failed SRA, a SymbolCount of a value of at least one change in a LEFTR (Low Error-Free Throughput Rate) defect state, a SymbolCount of a value of at least one change of a LEFTR defect Second state, a SymbolCount of a value of at least one change of an Uncorrected DTU (Data Transmission Unit) Second state, a SymbolCount of a value of at least one change of a Retransmitted DTU Second state, a SymbolCount of a value of at least one change of a Corrected DTU Second state, a SymbolCount of a value of at least one Retransmission request message, a SymbolCount of a value of at least one change of a Severely Uncorrected DTU Second state, a SymbolCount of a value of at least one change of a Severely Retransmitted DTU Second state, and a SymbolCount of a value of at least one change of a Severely Corrected DTU Second state, a state transition module configured to exit the first data communication state and enter a second data communication state; and a message assembly module configured to transmit a message, wherein the message contains information indicating at least three of the diagnostic data.

31. A system comprising:

a receiver module configured to receive or a transmitter module configured to transmit a plurality of multicarrier symbols in a first data communication state, wherein the first data communication state is a data transmission state, a Showtime state or steady state transmission;

a timestamp module configured to determine a timestamp, wherein the timestamp is a count of elapsed time after entering the first data communication state;

one or more of a diagnostic data collection module and a measuring module configured to at least one of determining, storing, measuring and detecting, prior to exiting the first data communication, three or more of following diagnostic data:

a timestamp of a last DMT (Discrete Multitone Modulation) symbol received or transmitted prior to exiting Showtime, a timestamp of at least one change of a LOS (Loss of Signal) defect state, a timestamp of at least one change of a SEF (Severely Errored Frame) defect state, a timestamp of at least one change of a LOM (Loss of Margin) defect state, a timestamp of at least one change of a far-end LOS defect state, a timestamp of at least one change of an RDI (Remote Defect Indication) defect state, a timestamp of at least one change of a far-end LOM defect state, a timestamp of at least one change of a LOS failure state, a timestamp of at least one change of a LOF (Loss of Frame) failure state, a timestamp of at least one change of an Errored Second state, a timestamp of at least one change of a Severely Errored Second state, one or more of a timestamp and a number of subcarriers of at least one Successful Receiver Bitswap, one or more of a timestamp and number of subcarriers of at least one Successful Transmitter Bitswap, one or more of a timestamp and number of subcarriers of at least one Failed Bitswap Request, one or more of a timestamp, a number of subcarriers and data rate change of at least one Successful Receiver SRA(Seamless Rate Adaptation), one or more of a timestamp, a number of subcarriers and data rate change of at least one Successful Transmitter SRA, one or more of a timestamp, a number of subcarriers and data rate change of at least one Failed SRA, a timestamp of at least one change in a LEFTR (Low Error-Free Throughput Rate) defect state, a timestamp of at least one change of a LEFTR defect Second state, a timestamp of at least one change of an Uncorrected DTU (Data Transmission Unit) Second state, a timestamp of at least one change of a Retransmitted DTU Second state, a timestamp of at least one change of a Corrected DTU Second state, a timestamp of at least one Retransmission request message, a timestamp of at least one change of a Severely Uncorrected DTU Second state, a timestamp of at least one change of a Severely Retransmitted DTU Second state, and a timestamp of at least one change of a Severely Corrected DTU Second state;

a state transition module configured to exit the first data communication state and enter a second data communication state; and a message assembly module configured to transmit a message, wherein the message contains information indicating at least three of the diagnostic data.

32. The system of claim 31, wherein the message is transmitted during an initialization or diagnostic mode after exiting the first data communication state.

* * * * *